a2 United States Patent
Yoshimura et al.

(10) Patent No.: US 11,265,133 B2
(45) Date of Patent: Mar. 1, 2022

(54) TERMINAL APPARATUS, BASE STATION APPARATUS, AND COMMUNICATION METHOD

(71) Applicants: Sharp Kabushiki Kaisha, Sakai (JP); FG Innovation Company Limited, New Territories (HK)

(72) Inventors: Tomoki Yoshimura, Sakai (JP); Shouichi Suzuki, Sakai (JP); Wataru Ohuchi, Sakai (JP); Liqing Liu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 199 days.

(21) Appl. No.: 16/617,080

(22) PCT Filed: May 21, 2018

(86) PCT No.: PCT/JP2018/019557
§ 371 (c)(1),
(2) Date: Nov. 26, 2019

(87) PCT Pub. No.: WO2018/221305
PCT Pub. Date: Dec. 6, 2018

(65) Prior Publication Data
US 2020/0084005 A1 Mar. 12, 2020

(30) Foreign Application Priority Data
Jun. 1, 2017 (JP) .............................. JP2017-109228

(51) Int. Cl.
H04L 5/00 (2006.01)
H04L 1/16 (2006.01)
(Continued)

(52) U.S. Cl.
CPC .......... H04L 5/0055 (2013.01); H04L 1/1671 (2013.01); H04L 5/0048 (2013.01); H04L 27/26 (2013.01); H04W 72/042 (2013.01)

(58) Field of Classification Search
None
See application file for complete search history.

(56) References Cited

U.S. PATENT DOCUMENTS

2014/0056184 A1* 2/2014 Yang ..................... H04L 1/1861
370/280
2018/0205525 A1* 7/2018 He ........................ H04L 5/0055
(Continued)

OTHER PUBLICATIONS

"3rd Generation Partnership Project; Technical Specification Group Radio Access Network; Study on New Radio (NR) Access Technology Physical Layer Aspects (Release 15)", 3GPP TR 38.802 V0.0.3, Mar. 2016, pp. 1-19.
(Continued)

Primary Examiner — Hassan A Phillips
Assistant Examiner — Gautam Sharma
(74) Attorney, Agent, or Firm — ScienBiziP, P.C.

(57) ABSTRACT

Provided is a terminal apparatus capable of efficiently performing uplink and/or downlink communication. A coding unit (1071) configured to divide a transport block into multiple CBs and code each of the multiple CBs, a transmitter (107) configured to transmit the transport block by using a PUSCH, and a receiver (105) configured to receive a first HARQ-ACK are included, wherein each of the multiple CBs is included in any one of multiple CBGs, the first HARQ-ACK includes a second HARQ-ACK for each of the multiple CBGs or a third HARQ-ACK for the transport block, in a case that a signal waveform applied to the PUSCH is OFDM, whether the first HARQ-ACK includes the second HARQ-ACK or the third HARQ-ACK is given based on higher layer signaling, and in a case that
(Continued)

a signal waveform applied to the PUSCH is DFT-s-OFDM, the first HARQ-ACK includes the third HARQ-ACK.

4 Claims, 13 Drawing Sheets

(51) Int. Cl.
*H04L 27/26* (2006.01)
*H04W 72/04* (2009.01)

(56) References Cited

U.S. PATENT DOCUMENTS

2018/0287763 A1* 10/2018 Baghel ................. H04W 28/04
2019/0356426 A1* 11/2019 He ..................... H04W 72/042
2020/0052835 A1* 2/2020 Xiong ................. H04L 1/1861

OTHER PUBLICATIONS

NTT Docomo, "New SID Proposal: Study on New Radio Access Technology", 3GPP TSG RAN Meeting #71, RP-160671, Mar. 7-10, 2016, 8 pages.

* cited by examiner

CBG is constructed without interleaving the first sequence $b_k$

CBG is constructed with interleaving the first sequence $b_k$ if $B \leq Z$ $L = 0$ Number of code blocks: $N_{CB} = 1$ $B' = B$ else $L = 24$ Number of code blocks: $N_{CB} = ceil(B/(Z-L))$.

$B' = B + N_{CB} \cdot L$ end if

B: Length of the second sequence $b_k$
Z: Maximum code block size
$N_{CB}$: Number of code blocks
B' : Length of the sequence $b_k$ including Third CRC bits
L: Length of the Third CRC bits

FIG. 10

```
Set

Set k = 0 and j = 0
while { k < E }
        if k = k + 1
        end if
    j = j + 1
end while
```

FIG. 11

TERMINAL APPARATUS, BASE STATION APPARATUS, AND COMMUNICATION METHOD

TECHNICAL FIELD

An aspect of the present invention relates to a terminal apparatus, a base station apparatus, and a communication method.

BACKGROUND ART

A radio access method and a radio network for cellular mobile communications (hereinafter, referred to as "Long Term Evolution (LTE)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

In 3GPP, to propose to International Mobile Telecommunication (IMT)-2020 that is a standard for next-generation mobile communication systems established by the International Telecommunications Union (ITU), a next-generation standard (New Radio (NR)) has been studied (NPL 1). In a single technology framework, NR is required to satisfy requirements assuming three scenarios including enhanced Mobile BroadBand (eMBB), massive Machine Type Communication (mMTC), and Ultra Reliable and Low Latency Communication (URLLC).

In order to satisfy the above requirements, error correction codes employed in NR have been studied (NPL 2).

CITATION LIST

Non Patent Literature

NPL 1: "New SID proposal: Study on New Radio Access Technology", RP-160671, NTT docomo, 3GPP TSG RAN Meeting #71, Goteborg, Sweden, 7 to 10 Mar. 2016.
NPL 2: "3GPP TR 38.802 V0.0.3 (2016-03)", R1-165889, 9 Jun. 2016.

SUMMARY OF INVENTION

Technical Problem

The present invention provides a terminal apparatus that can perform uplink and/or downlink communication efficiently, a communication method used for the terminal apparatus, an integrated circuit implemented in the terminal apparatus, a base station apparatus that can perform uplink and/or downlink communication efficiently, a communication method used for the base station apparatus, and an integrated circuit implemented in the base station apparatus.

Solution to Problem (1) A first aspect of the present invention is a terminal apparatus including: a coding unit configured to divide a transport block into multiple CBs and code each of the multiple CBs; a transmitter configured to transmit the transport block by using a PUSCH; and a receiver configured to receive a first HARQ-ACK, wherein each of the multiple CBs is included in any one of multiple CBGs, the first HARQ-ACK includes a second HARQ-ACK for each of the multiple CBGs or a third HARQ-ACK for the transport block, in a case that a signal waveform applied to the PUSCH is OFDM, whether the first HARQ-ACK includes the second HARQ-ACK or the third HARQ-ACK is given based on higher layer signaling, and in a case that a signal waveform applied to the PUSCH is DFT-s-OFDM, the first HARQ-ACK includes the third HARQ-ACK (regardless of the higher layer signaling).

(2) A second aspect of the present invention is a base station apparatus including: a receiver configured to receive a transport block on a PUSCH; a decoding unit configured to decode the transport block divided into multiple CBs; and a transmitter configured to transmit a first HARQ-ACK, wherein each of the multiple CBs is included in any one of multiple CBGs, the first HARQ-ACK includes a second HARQ-ACK for each of the multiple CBGs or a third HARQ-ACK for the transport block, in a case that a signal waveform applied to the PUSCH is OFDM, whether the first HARQ-ACK includes the second HARQ-ACK or the third HARQ-ACK is given based on higher layer signaling, and in a case that a signal waveform applied to the PUSCH is DFT-s-OFDM, the first HARQ-ACK includes the third HARQ-ACK (regardless of the higher layer signaling).

(3) A third aspect of the present invention is a communication method used for a terminal apparatus, the communication method including the steps of: dividing a transport block into multiple CBs and coding each of the multiple CBs; transmitting the transport block by using a PUSCH; and receiving a first HARQ-ACK, wherein each of the multiple CBs is included in any one of multiple CBGs, the first HARQ-ACK includes a second HARQ-ACK for each of the multiple CBGs or a third HARQ-ACK for the transport block, in a case that a signal waveform applied to the PUSCH is OFDM, whether the first HARQ-ACK includes the second HARQ-ACK or the third HARQ-ACK is given based on higher layer signaling, and in a case that a signal waveform applied to the PUSCH is DFT-s-OFDM, the first HARQ-ACK includes the third HARQ-ACK (regardless of the higher layer signaling).

(4) A fourth aspect of the present invention is a communication method used for a base station apparatus, the communication method including the steps of: receiving a transport block on a PUSCH; decoding the transport block divided into multiple CBs; and transmitting a first HARQ-ACK, wherein each of the multiple CBs is included in any one of multiple CBGs, the first HARQ-ACK includes a second HARQ-ACK for each of the multiple CBGs or a third HARQ-ACK for the transport block, in a case that a signal waveform applied to the PUSCH is OFDM, whether the first HARQ-ACK includes the second HARQ-ACK or the third HARQ-ACK is given based on higher layer signaling, and in a case that a signal waveform applied to the PUSCH is DFT-s-OFDM, the first HARQ-ACK includes the third HARQ-ACK (regardless of the higher layer signaling).

Advantageous Effects of Invention

According to the present invention, the terminal apparatus can perform uplink and/or downlink communication efficiently. The base station apparatus can perform uplink and/or downlink communication efficiently.

BRIEF DESCRIPTION OF DRAWINGS

FIG. 10 is a diagram illustrating an example of a first procedure for calculating the number of code blocks in the code block segmentation unit 4011 according to the aspect of the present embodiment.

FIG. 11 is a diagram illustrating an example of a rate matching operation of a bit selection and pruning unit 4005 according to an aspect of the present embodiment.

DESCRIPTION OF EMBODIMENTS

Embodiments of the present invention will be described below. The term "given" included in the following description may be interpreted as either "determined" or "configured."

Figure 1:
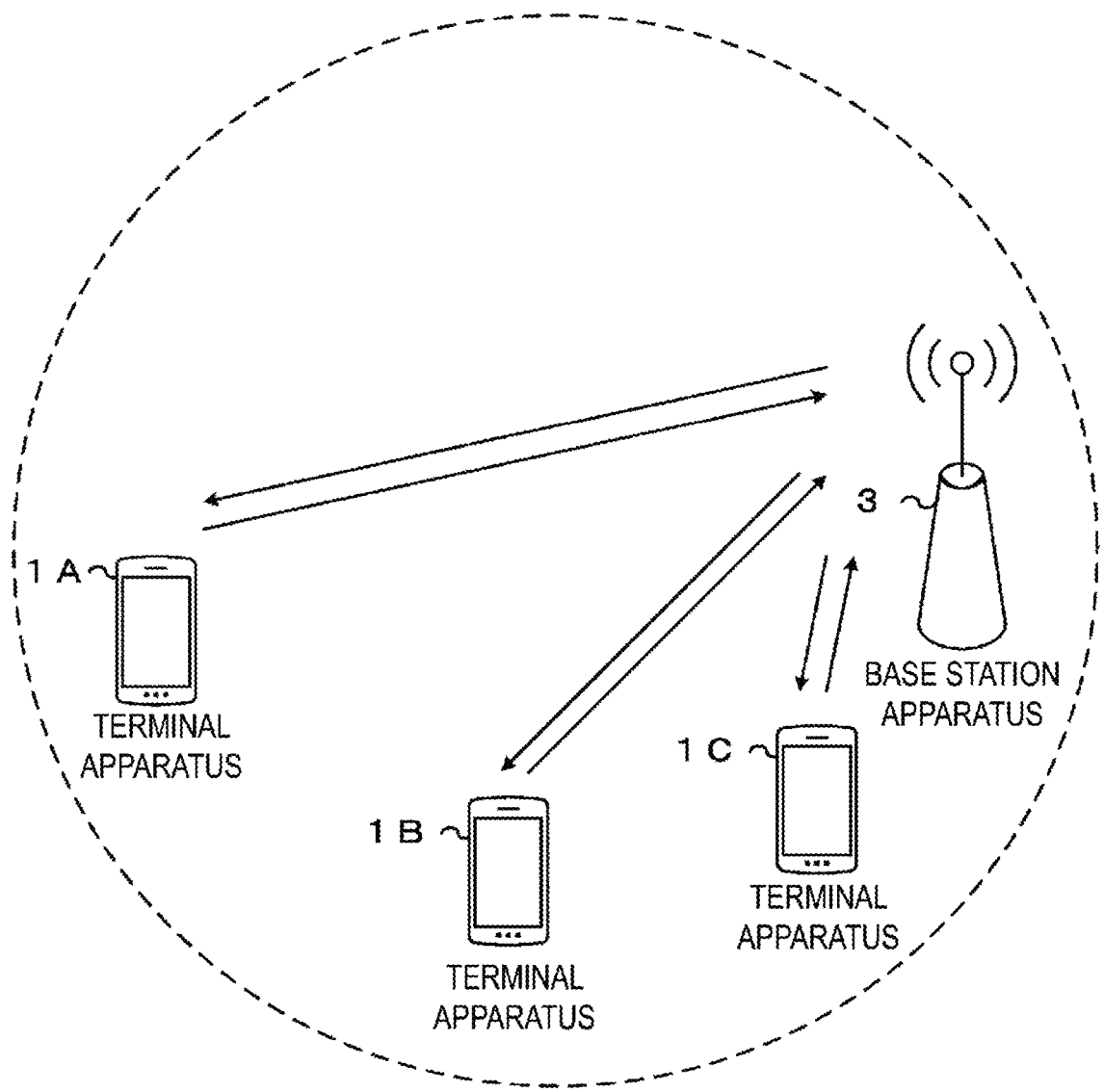
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Hereinafter, the terminal apparatuses 1A to 1C are also referred to as a terminal apparatus 1.

A configuration of a radio frame according to the present embodiment will be described below.

Figure 2:
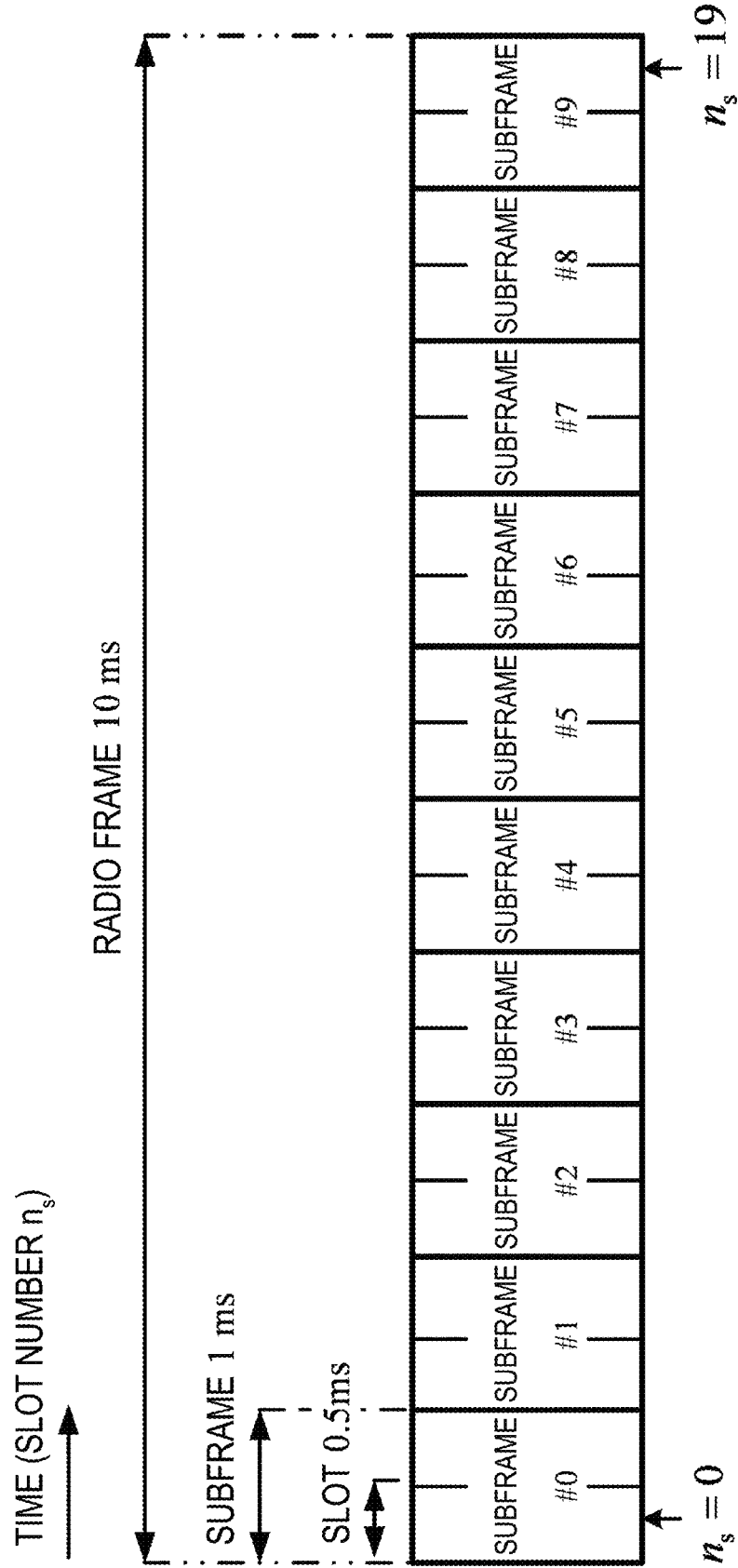
FIG. 2 is an example illustrating a configuration of a radio frame, a subframe, and a slot according to an aspect of the present embodiment.

FIG. 2 is an example illustrating a configuration of a radio frame, a subframe, and a slot according to an aspect of the present embodiment. In one example illustrated in FIG. 2, the length of the slot is 0.5 ms, the length of the subframe is 1 ms, and the length of the radio frame is 10 ms. The slot may be a unit of resource allocation in the time domain. The slot may be a unit to which one transport block is mapped. The transport block may be mapped to one slot. The transport block may be a unit of data transmitted within a prescribed interval (for example, Transmission Time Interval (TTI) defined by a higher layer (for example, Mediam Access Control (MAC)).

The length of the slot may be given by the number of OFDM symbols. For example, the number of OFDM symbols may be seven or 14. The length of the slot may be given based at least on the length of the OFDM symbol. The length of the OFDM symbol may be given based at least on a second subcarrier spacing. The length of the OFDM symbol may be given based on at least the number of points in Fast Fourier Transform (FFT) used for generation of the OFDM symbol. The length of the OFDM symbol may include a length of a Cyclic Prefix (CP) added to the OFDM symbol. Here, the OFDM symbol may be referred to as a symbol. In a case that a communication scheme other than OFDM is used in communication between the terminal apparatus 1 and the base station apparatus 3 (for example, in a case that SC-FDMA or DFT-s-OFDM is used), the SC-FDMA symbol and/or the DFT-s-OFDM symbol to be generated is also referred to as an OFDM symbol. For example, the length of the slot may be 0.25 ms, 0.5 ms, 1 ms, 2 ms, or 3 ms. Unless otherwise stated, OFDM includes SC-FDMA or DFT-s-OFDM.

OFDM includes a multi-carrier communication scheme in which Pulse Shape, PAPR reduction, out-of-band radiation reduction, or filtering, and/or phase processing (for example, phase rotation, or the like) is applied. The multi-carrier communication scheme may be a communication scheme that generates and/or transmits signals multiplexed with multiple subcarriers.

The length of the subframe may be 1 ms. The length of the subframe may be given based on a first subcarrier spacing. For example, in a case that the first subcarrier spacing is 15 kHz, the length of the subframe may be 1 ms. The subframe may include one or more slots. For example, the subframe may include two slots.

The radio frame may include multiple subframes. The number of subframes for the radio frame may be, for example, 10. The radio frame may include multiple slots. The number of slots for the radio frame may be, for example, 10.

Physical channels and physical signals according to various aspects of the present embodiment will be described below.

The downlink physical channels and the downlink physical signals are also referred to as a downlink signal. The uplink physical channels and the uplink physical signals are also referred to as an uplink signal. The downlink physical channels and the uplink physical channels are collectively referred to as a physical channel. The downlink physical signals and the uplink physical signals are collectively referred to as a physical signal.

In FIG. 1, at least the following uplink physical channels are used for uplink radio communication from the terminal apparatus 1 to the base station apparatus 3. The uplink physical channels are used by a physical layer for transmission of information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes: Channel State Information (CSI) for downlink channel; a Scheduling Request (SR) to be used to request a PUSCH (Uplink-Shared Channel (UL-SCH)) resource for initial transmission; and a Hybrid Automatic Repeat request ACKnowledgement (HARQ-ACK) for downlink data (a Transport Block (TB), a Medium Access Control Protocol Data Unit (MAC PDU), a Downlink-Shared Channel (DL-SCH), or a Physical Downlink Shared Channel (PDSCH)). The HARQ-ACK indicates an acknowledgement (ACK) or a negative-acknowledgement (NACK). The HARQ-ACK is also referred to as HARQ feedback, HARQ information, HARQ control information, and ACK/NACK. The HARQ-ACK may include an HARQ-ACK for a Code Block Group (CBG). The HARQ-ACK for some or all of the CBGs included in the transport block may be transmitted in the PUCCH or the PUSCH.

The Channel State Information (CSI) includes at least a Channel Quality Indicator (CQI) and a Rank Indicator (RI). The channel quality indicator may include a Precoder Matrix Indicator (PMI). The CQI is an indicator associated with channel quality (propagation strength), and the PMI is an indicator that indicates a precoder. The RI is an indicator indicating the transmission rank (or the number of transmission layers).

The PUSCH is used to transmit uplink data (TB, MAC PDU, UL-SCH, or PUSCH). The PUSCH may be used to transmit the HARQ-ACK and/or the channel state information along with the uplink data. The PUSCH may be used to transmit only the channel state information or to transmit only the HARQ-ACK and the channel state information. The PUSCH is used to transmit random access message 3.

The PRACH is used to transmit a random access preamble (random access message 1). The PRACH is used for indicating an initial connection establishment procedure, a handover procedure, a connection re-establishment procedure, synchronization (timing adjustment) for uplink data transmission, and a request for a PUSCH (UL-SCH) resource. The random access preamble may be used to notify the base station apparatus 3 of the index (random access preamble index) given by the higher layer of the terminal apparatus 1.

The random access preamble may be given by performing cyclic shift on the Zadoff-Chu sequence corresponding to the physical root sequence index u. The Zadoff-Chu sequence may be generated based on the physical root sequence index u. In one cell, multiple random access preambles may be defined. The random access preamble may be identified based at least on the index of the random access preamble. Different random access preambles corresponding to different indexes with the random access preambles may correspond to different combinations of physical root sequence index u and cyclic shift. The physical root sequence index u and the cyclic shift may be given based at least on information included in the system information. The physical root sequence index u may be an index identifying a sequence included in the random access preamble. The random access preamble may be identified based at least on the physical root sequence index u.

In FIG. 1, the following uplink physical signal is used for uplink radio communication from the terminal apparatus 1 to the base station apparatus 3. The uplink physical signal may not be used for transmitting information output from the higher layer, but is used by the physical layer.

Uplink Reference Signal (UL RS)

According to the present embodiment, at least the following two types of uplink reference signals may be at least used.

Demodulation Reference Signal (DMRS)

Sounding Reference Signal (SRS)

The DMRS is associated with transmission of the PUSCH and/or the PUCCH. The DMRS may be multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. The DMRS may be a DMRS corresponding to the PUSCH. Transmission of both of the PUCCH and the DMRS is hereinafter referred to simply as transmission of the PUCCH. The DMRS may be a DMRS corresponding to the PUCCH.

The SRS may not be associated with the transmission of the PUSCH or the PUCCH. The base station apparatus 3 may use the SRS for measuring the channel state. The SRS may be transmitted at the end of subframes in uplink slots or at a prescribed number of OFDM symbols from the end.

In FIG. 1, the following downlink physical channels are used for downlink radio communication from the base station apparatus 3 to the terminal apparatus 1. The downlink physical channels are used by the physical layer for transmission of information output from the higher layer.

Physical Broadcast Channel (PBCH)

Physical Downlink Control Channel (PDCCH)

Physical Downlink Shared Channel (PDSCH)

The PBCH is used for broadcasting a Master Information Block (MIB, a Broadcast Channel (BCH)) that is shared by the terminal apparatuses 1. The PBCH may be transmitted based on a prescribed transmission interval. For example, the PBCH may be transmitted at 80 ms intervals. At least some of information included in the PBCH may be updated at every 80 ms. The PBCH may be configured with 288 subcarriers. The PBCH may include, two, three, or four OFDM symbols. The MIB may include information associated with an identifier (index) of a synchronization signal. The MIB may include information indicating at least some of the number of the slot, the number of the subframe, and the number of the radio frame in which the PBCH is transmitted.

The PDCCH is used to transmit Downlink Control Information (DCI). The downlink control information is also referred to as DCI format. The downlink control information may include at least one of a downlink grant or an uplink grant. The downlink grant is also referred to as a downlink assignment or a downlink allocation. The uplink grant and the downlink grant are collectively also referred to as a grant.

The downlink control information may be transmitted including information indicating which CBG is actually transmitted (information indicating transmission of a CBG). The Information indicating transmission of a CBG may indicate the CBG included in the PDSCH scheduled by the downlink control information. The information indicating transmission of a CBG may be a bitmap given based at least on the number of CBGs included in the transport block and/or the maximum number of CBGs included in the transport block. Each of the bits included in the bitmap may correspond to one CBG. The bits may be set to '1' to indicate that a CBG is to be transmitted. The bits may be set to '0' to indicate that no CBG is transmitted.

The downlink control information may be transmitted including information indicating a soft bit corresponding to which CBG to flush (information associated with soft bits). The soft bit corresponding to a CBG may be a soft bit corresponding to a CB included in the CBG. "To flash a soft bit" may be "to delete a soft bit stored in a prescribed storage capacity from the prescribed storage capacity." The prescribed storage capacity may be, for example, a memory, a buffer, a disk, or the like. The information associated with soft bits may be a bitmap given based at least on the number of CBGs included in the transport block and/or the maximum number of CBGs included in the transport block. The information associated with soft bits may be information indicating switching of a processing method of a stored soft bit corresponding to a CBG (for example, whether or not to flush the stored soft bit). Each of the bits included in the bitmap may correspond to one CBG. In order to indicate the terminal apparatus 1 to flush a soft bit corresponding to a CBG, the bit may be set to '1'. In order to indicate the terminal apparatus 1 not to flush a soft bit corresponding to a CBG, the bit may be set to '0'.

The terminal apparatus 1 may store some or all of soft bits of the code block in a case that decoding of the code block of the transport block is unsuccessful. The terminal apparatus 1 may flush the soft bits of the code block, based on information associated with the soft bits. For example, in a case that the terminal apparatus 1 is indicated to flush a soft bit corresponding to a CBG by information associated with the soft bit, the terminal apparatus 1 may flush the soft bit of the code block included in the CBG.

The terminal apparatus 1 may receive downlink control information for scheduling a transport block corresponding to a prescribed HARQ process, and in a case that a value of a new data indicator included in the downlink control information is changed from a new data indicator for the transport block immediately before corresponding to the prescribed HARQ process, the terminal apparatus 1 may flush a soft bit for the transport block immediately before.

The downlink control information for scheduling the initial transmission of the transport block may not include information indicating transmission of a CBG and/or information associated with soft bits. The downlink control information for scheduling the initial transmission of the transport block may include information indicating transmission of a CBG and/or information associated with soft bits. Information indicating transmission of a CBG included in the downlink control information for scheduling the initial transmission of the transport block, and/or information associated with soft bits may be set to a predefined bit sequence (for example, all 0 sequence or all 1 sequence). Information indicating transmission of a CBG included in the downlink control information for scheduling the initial transmission of the transport block and/or information associated with soft bits may be reserved.

Whether or not the transport block is the initial transmission may be given based on at least the new data indicator included in the downlink control information for scheduling the transport block. For example, whether or not the transport block corresponding to the prescribed HARQ process number is the initial transmission may be given based on whether or not the new data indicator included in the downlink control information for scheduling the transport block that corresponds to the prescribed HARQ process number and is changed from the new data indicator corresponding to the transport block transmitted immediately before.

The downlink control information for scheduling a retransmission of the transport block may not include information indicating transmission of a CBG and/or information associated with soft bits. The downlink control information for scheduling a retransmission of the transport block may include information indicating transmission of a CBG and/or information associated with soft bits.

The downlink control information may include a New Data Indicator (NDI). The new data indicator is information indicating whether or not the transport block that corresponds to a prescribed HARQ process number and is transmitted immediately before is the same as the transport block that corresponds to the prescribed HARQ process number and is to be scheduled by the downlink control information including the new data indicator. The HARQ process number is a number used to identify the HARQ process. The HARQ process number may be included in the downlink control information. The HARQ process is a process for managing the HARQ. The new data indicator may indicate whether or not transmission of a transport block that corresponds to a prescribed HARQ process number and is scheduled by the downlink control information including the new data indicator is a retransmission of the transport block that corresponds to the prescribed HARQ process number and is transmitted immediately before. Whether or not transmission of the transport block scheduled by the downlink control information is a retransmission of the transport block that is transmitted immediately before may be given based on whether or not the new data indicator is changed from (or toggled for) the new data indicator corresponding to the transport block that is transmitted immediately before.

One downlink grant is at least used for scheduling of one PDSCH within one serving cell. The downlink grant is at least used for scheduling of the PDSCH within the same slot as the slot on which the downlink grant is transmitted.

One uplink grant is at least used for scheduling of one PUSCH within one serving cell.

In the terminal apparatus 1, one or more control resource sets are configured for searching for the PDCCH. The terminal apparatus 1 attempts to receive the PDCCH in the configured control resource sets.

Hereinafter, the control resource sets will be described.

Figure 3:
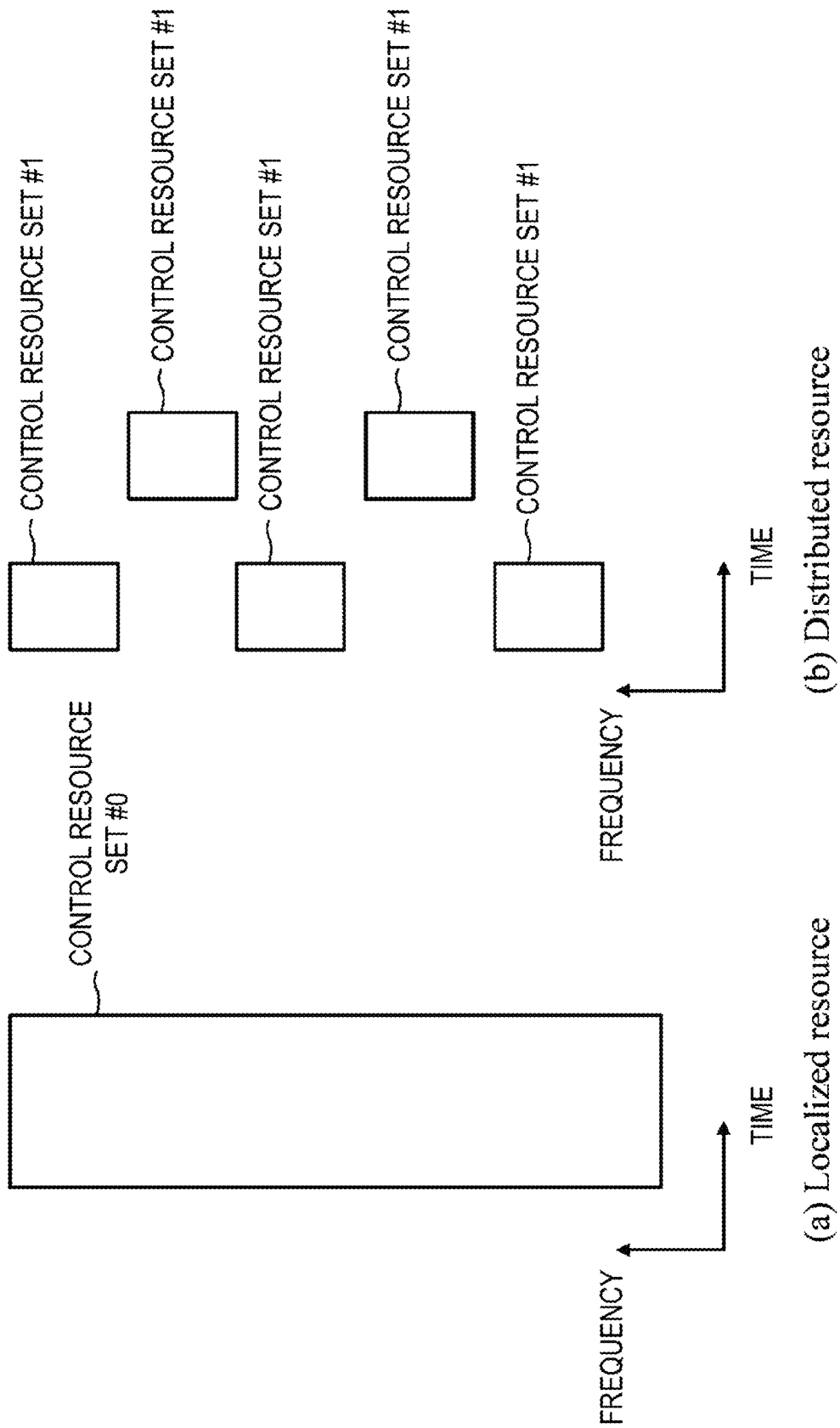
FIG. 3 is a diagram illustrating an example of mapping of a control resource set according to an aspect of the present embodiment.

FIG. 3 is a diagram illustrating an example of mapping of the control resource sets according to an aspect of the present embodiment. Each control resource set may indicate a time and frequency domain in which one or more control channels may be mapped. The control resource set may be a domain in which the terminal apparatus 1 attempts to receive the PDCCH. As illustrated in FIG. 3(*a*), the control resource set may be constituted with continuous resources (a Localized resource). As illustrated in FIG. 3(*b*), the control resource set may be constituted with non-continuous resources (distributed resources).

In the frequency domain, the unit of mapping of the control resource set may be a resource block. In the time domain, the unit of mapping of the control resource set may be an OFDM symbol.

The frequency domain of the control resource set may be the same as the system bandwidth of the serving cell. The frequency domain of the control resource set may also be given based at least on the system bandwidth of the serving cell. The frequency domain of the control resource set may be given based at least on higher layer signaling and/or the downlink control information. The frequency domain of the control resource set may be given based at least on the synchronization signal or the bandwidth of the PBCH. The frequency domain of the control resource set may be the same as the synchronization signal or the bandwidth of the PBCH.

The time domain of the control resource set may be given based at least on the higher layer signaling and/or the downlink control information.

The control resource set may include at least one or both of a Common control resource set and a Dedicated control resource set. The common control resource set may be a control resource set configured in common to the multiple terminal apparatuses 1. The common control resource set may be given based at least on the MIB, first system information, second system information, common RRC signaling, cell ID, and the like. The dedicated control resource set may be a control resource set configured to be used for the terminal apparatus 1 in a dedicated manner. The dedicated control resource set may be given based at least on the dedicated RRC signaling and/or a value of a C-RNTI.

The control resource set may be a set of control channels (or control channel candidates) to be monitored by the terminal apparatus 1. The control resource set may include a set of control channels (or control channel candidates) to be monitored by the terminal apparatus 1. The control resource set may include one or more Search Spaces (SS). The control resource set may be a search space.

The search space includes one or more PDCCH candidates. The terminal apparatus 1 receives the PDCCH candidates included in the search space and attempts to receive the PDCCH. Here, the PDCCH candidates are also referred to as blind detection candidates.

The search space may include at least one or both of a Common Search Space (CSS) and a UE-specific Search Space (USS). The CSS may be a search space configured in common to multiple terminal apparatuses 1. The USS may be a search space including a configuration dedicated to the terminal apparatus 1. The CSS may be given based at least on the MIB, first system information, second system information, common RRC signaling, cell ID, and the like. The USS may be given based at least on the dedicated RRC signaling and/or the value of the C-RNTI.

The common control resource set may include at least one or both of the CSS and the USS. The dedicated control resource set may include at least one or both of the CSS and the USS. The dedicated control resource set may not include the CSS.

The physical resources of the search space are constituted with Control Channel Elements (CCE). The CCE is constituted with a prescribed number of Resource Element Groups (REGs). For example, the CCE may be constituted with six REGs. The REG may be configured with one OFDM symbol of one Physical Resource Block (PRB). In other words, the REG may include 12 Resource Elements (REs). The PRB is also referred to simply as a Resource Block (RB).

The PDSCH is used to transmit downlink data (DL-SCH, PDSCH). The PDSCH is at least used to transmit random access message 2 (random access response). The PDSCH is at least used to transmit system information including a parameter used for the initial access.

In FIG. 1, the following downlink physical signals are used for the downlink radio communication. The downlink physical signals may not be used for transmitting information output from the higher layer, but is used by the physical layer.

Synchronization signal (SS)
Downlink Reference Signal (DL RS)

The synchronization signal is used for the terminal apparatus 1 to establish synchronization in the frequency domain and the time domain in the downlink. The synchronization signal includes a Primary Synchronization Signal (PSS) and a Second Synchronization Signal (SSS).

The downlink reference signal is used for the terminal apparatus 1 to perform channel compensation on the downlink physical channel. The downlink reference signal is used for the terminal apparatus 1 to calculate the downlink channel state information.

According to the present embodiment, the following two types of downlink reference signals are used.

DeModulation Reference Signal (DMRS)
Shared Reference Signal (Shared RS)

The DMRS corresponds to transmission of the PDCCH and/or the PDSCH. The DMRS is multiplexed with the PDCCH or the PDSCH. The terminal apparatus 1 may use the DMRS corresponding to the PDCCH or the PDSCH to perform channel compensation of the PDCCH or the PDSCH. Hereinafter, the PDCCH and the DMRS corresponding to the PDCCH being transmitted together is referred to simply as the PDCCH being transmitted. Hereinafter, the PDSCH and the DMRS corresponding to the PDSCH being transmitted together is referred to simply as the PDSCH being transmitted.

The Shared RS may correspond to transmission of at least the PDCCH. The Shared RS may be multiplexed with the PDCCH. The terminal apparatus 1 may use the Shared RS to perform channel compensation of the PDCCH. Hereinafter, the PDCCH and the Shared RS being transmitted together is referred to simply as the PDCCH being transmitted.

The DMRS may be an RS individually configured to the terminal apparatus 1. The DMRS sequence may be given based on at least a parameter individually configured to the terminal apparatus 1. The DMRS may be individually transmitted for the PDCCH and/or the PDSCH. On the other hand, the Shared RS may be an RS configured in common to the multiple terminal apparatuses 1. The Shared RS sequence may be given regardless of the parameter individually configured to the terminal apparatus 1. For example, the Shared RS sequence may be given based on at least some of the number of the slot, the number of the mini slot, and the cell ID (identity). The Shared RS may be an RS transmitted regardless of whether or not the PDCCH and/or the PDSCH is transmitted.

The BCH, the UL-SCH, and the DL-SCH are transport channels. A channel used in the Medium Access Control (MAC) layer is referred to as a transport channel. A unit of the transport channel used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. The base station apparatus 3 and the terminal apparatus 1 may transmit and/or receive a MAC Control Element (CE) in the MAC layer. Here, the RRC signaling and/or the MAC CE is also referred to as higher layer signaling.

The PUSCH and the PDSCH is at least used to transmit the RRC signaling and the MAC CE. Here, the RRC signaling transmitted from the base station apparatus 3 on the PDSCH may be signaling common to multiple terminal apparatuses 1 in a cell. The signaling common to multiple terminal apparatuses 1 in a cell is also referred to as common RRC signaling. The RRC signaling transmitted from the base station apparatus 3 on the PDSCH may be signaling dedicated to a certain terminal apparatus 1 (also referred to as dedicated signaling or UE specific signaling). The signaling dedicated to the terminal apparatus 1 is also referred to as dedicated RRC signaling. A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1. The PDSCH including the dedicated RRC signaling may be scheduled by the PDCCH in the first control resource set.

A Broadcast Control CHannel (BCCH), a Common Control CHannel (CCCH), and a Dedicated Control CHannel (DCCH) are logical channels. For example, the BCCH is a higher layer channel used to transmit the MIB. The Common Control Channel (CCCH) is a higher layer channel used to transmit common information in the multiple terminal apparatuses 1. Here, the CCCH is used for the terminal apparatus 1 that is not in RRC connection, for example. The Dedicated Control Channel (DCCH) is a higher layer channel used to transmit individual control information (dedicated control information) to the terminal apparatus 1. Here, the DCCH is used for the terminal apparatus 1 that is in RRC connection, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

An example method of the initial connection will be described below.

The base station apparatus 3 covers a communicable range (or communication area) controlled by the base station apparatus 3. The communicable range is divided into one or multiple cells (or serving cells, sub cells, beams, and the like), and communication with the terminal apparatus 1 can be managed for each cell. On the other hand, the terminal apparatus 1 selects at least one cell from among the multiple cells, and attempts to establish a connection with the base station apparatus 3. Here, a first state in which a connection between the terminal apparatus 1 and at least one cell of the base station apparatus 3 is established is also referred to as RRC Connection. A second state in which a connection between the terminal apparatus 1 and any cell of the base station apparatus 3 is not established is also referred to as RRC idle. A third state in which, although a connection is established between the terminal apparatus 1 and at least one cell of the base station apparatus 3, some functions are limited between the terminal apparatus 1 and the base station apparatus 3, is also referred to as RRC suspended. The RRC suspended is also referred to as RRC inactive.

Figure 4:
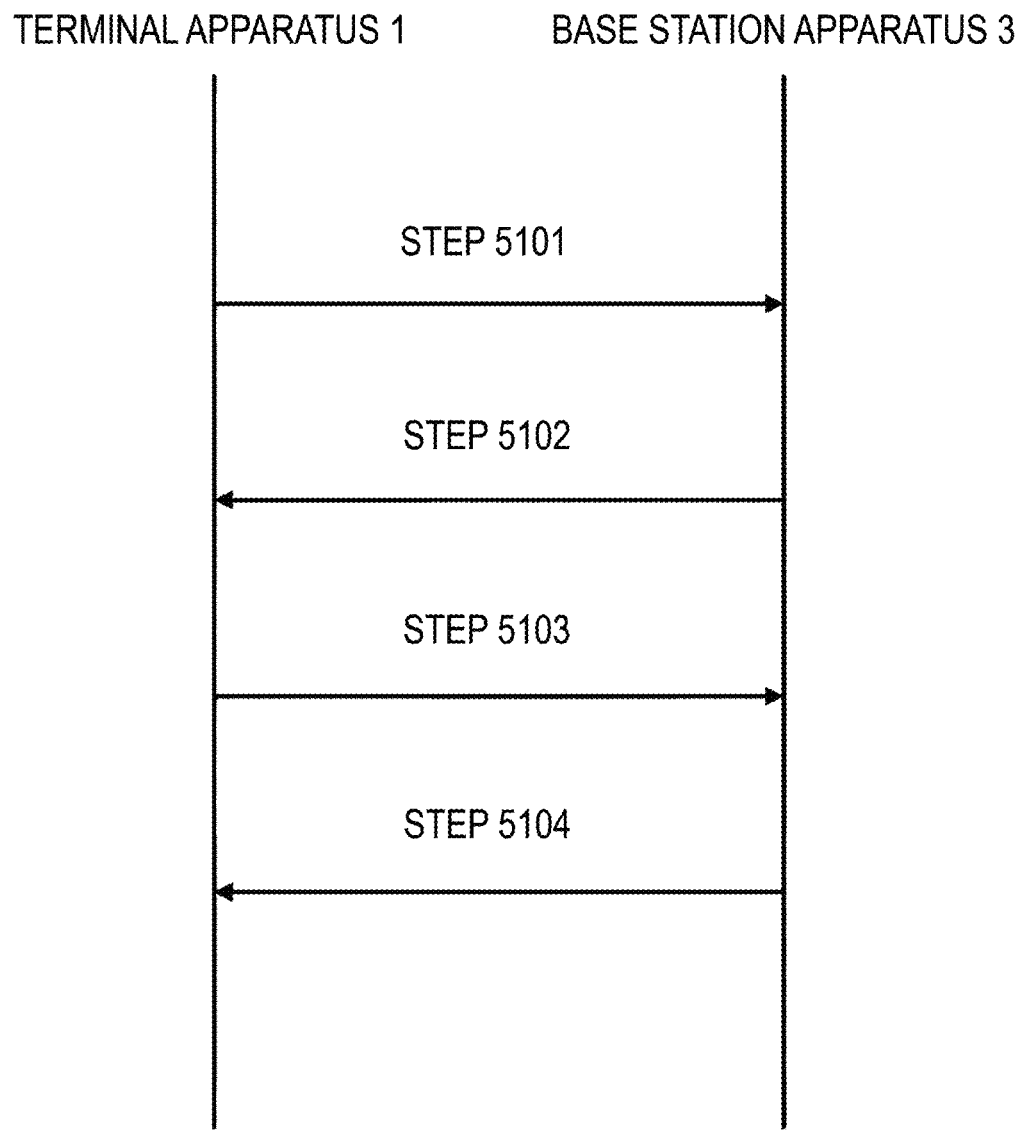
FIG. 4 is a diagram illustrating an example of a first initial connection procedure (4-step contention based RACH procedure) according to an aspect of the present embodiment.

The terminal apparatus 1 in the RRC idle may attempt to establish a connection with at least one cell of the base station apparatus 3. Here, a cell to which the terminal apparatus 1 attempts to connect is also referred to as a target cell. FIG. 4 is a diagram illustrating an example of a first initial connection procedure (4-step contention based RACH procedure) according to an aspect of the present embodiment. The first initial connection procedure includes at least some of Steps 5101 to 5104.

Step 5101 is a step in which the terminal apparatus 1 requests, via the physical channel, a response for the initial connection to the target cell. Alternatively, Step 5101 is a step in which the terminal apparatus 1 performs a first transmission to the target cell via the physical channel. Here, the physical channel may be, for example, the PRACH. The physical channel may be a channel dedicated to requesting a response for the initial connection. The physical channel may be the PRACH. In Step 5101, a message transmitted from the terminal apparatus 1 via the physical channel is also referred to as random access message 1.

The terminal apparatus 1 performs a downlink time frequency synchronization prior to performing Step 5101. In the first state, a synchronization signal is used for the terminal apparatus 1 to perform the downlink time frequency synchronization.

The synchronization signal may be transmitted including the ID (cell ID) of the target cell. The synchronization signal may be transmitted including a sequence generated based at least on the cell ID. The synchronization signal including the cell ID may be a sequence of the synchronization signal given based on the cell ID. A beam (or precoder) may be applied to the synchronization signal to be transmitted.

The beam exhibits a phenomenon in which antenna gain varies depending on the direction. The beam may be given based at least on the directivity of the antenna. The beam may also be given based at least on a phase transform of the carrier signal. The beam may also be given by applying a precoder.

The terminal apparatus 1 receives the PBCH transmitted from the target cell. The PBCH may be transmitted including an important information block (Master Information Block (MIB), Essential Information Block (EIB)) including important system information used by the terminal apparatus 1 to connect to the target cell. The important information block is system information. The important information block may include information related to a radio frame number. The important information block may include information related to a location within a super frame including multiple radio frames (information indicating at least some of System Frame Numbers (SFNs) within the super frame, for example). The PBCH may also include an index of the synchronization signal. The important information block may be mapped to the BCH in the transport channel. The important information block may be mapped to the BCCH in the logical channel.

The terminal apparatus 1 performs monitoring of the first control control resource set. The first control resource set is at least used for scheduling of the first system information. The first system information may include system information important for the terminal apparatus 1 to connect to the target cell. The first system information may include information related to various configurations of the downlink. The first system information may include information related to various settings of the PRACH. The first system information may include information related to various configurations of the uplink. The first system information may include information indicating a signal waveform (OFDM or DFT-s-OFDM) configured for the transmission of random access message 3. The first system information may include at least a portion of system information other than information included in the MIB. The first system information may be mapped to the BCH in the transport channel. The first system information may be mapped to the BCCH in the logical channel. The first system information may include at least System Information Block type1 (SIB1). The first system information may include at least System Information Block type1 (SIB2). The first control resource set may be used for scheduling of random access message 2. Note that the SIB1 may include information related to measurements required to perform the RRC connection. The SIB2 may include information related to common and/or shared channels among multiple terminal apparatuses 1 in the cell.

Step 5102 is a step in which the base station apparatus 3 performs a response to the terminal apparatus 1 for random access message 1. The response is also referred to as random access message 2. Random access message 2 may be transmitted via the PDSCH. The PDSCH including random access message 2 is scheduled by the PDCCH. CRC bits included in the PDCCH may be scrambled with the Random access-RNTI (RA-RNTI). Random access message 2 may be transmitted including a special uplink grant. The special uplink grant is also referred to as a random access response grant. The special uplink grant may be included in the PDSCH including random access message 2. The random access response grant may be transmitted including at least Temporary C-RNTI. The RA-RNTI may be an RNTI used for monitoring random access message 2. The RA-RNTI may be given based at least on a preamble index of random access message 1 transmitted by the terminal apparatus 1. The RA-RNTI may be given based at least on a radio resource used for the transmission of random access message 1 (for example, may include some or all of an index of a PRB, a subcarrier index, an index of an OFDM symbol, an index of a slot, and an index of a subframe). The Temporary C-RNTI may be an RNTI used for monitoring random access message 4. The Temporary C-RNTI may be included in the random access response grant.

Step 5103 is a step in which the terminal apparatus 1 transmits a request for the RRC connection to the target cell. The request for the RRC connection is also referred to as random access message 3. Random access message 3 may be transmitted via the PUSCH scheduled by the random access response grant. Random access message 3 may include an ID used to identify the terminal apparatus 1. The ID may be an ID managed by the higher layer. The ID may be a SAE Temporary Mobile Subscriber Identity (S-TMSI). Random access message 3 may be mapped to the CCCH in the logical channel. Random access message 3 may be mapped to the UL-SCH in the transport channel.

Step 5104 is a step in which the base station apparatus 3 transmits a Contention resolution message to the terminal apparatus 1. The contention resolution message is also referred to as random access message 4. After transmission of random access message 3, the terminal apparatus 1 performs monitoring of the PDCCH for scheduling the PDSCH including random access message 4. Random access message 4 may include a contention avoidance ID. Here, the contention avoidance ID is used to resolve a contention in which multiple terminal apparatuses 1 transmit signals using the same radio resource. The contention avoidance ID is also referred to as a UE contention resolution identity. Random access message 4 may be mapped to the CCCH in the logical channel. Random access message 4 may be mapped to the DL-SCH in the transport channel.

In step 5104, the terminal apparatus 1 that has transmitted random access message 3 including the ID (S-TMSI, for example) used for the identification of the terminal apparatus 1 monitors random access message 4 including the contention resolution message. In a case that the contention avoidance ID included in random access message 4 is the same as the ID used for the identification of the terminal apparatus 1, the terminal apparatus 1 may consider that the contention resolution has been successfully completed and set the value of the Temporary C-RNTI in the C-RNTI field. The terminal apparatus 1 in which the value of the Temporary C-RNTI is set in the C-RNTI field is considered to have successfully completed the RRC connection (or the initial connection procedure).

A transmission process 3000 included in the base station apparatus 3 and/or the terminal apparatus 1 will be described below.

Figure 5:
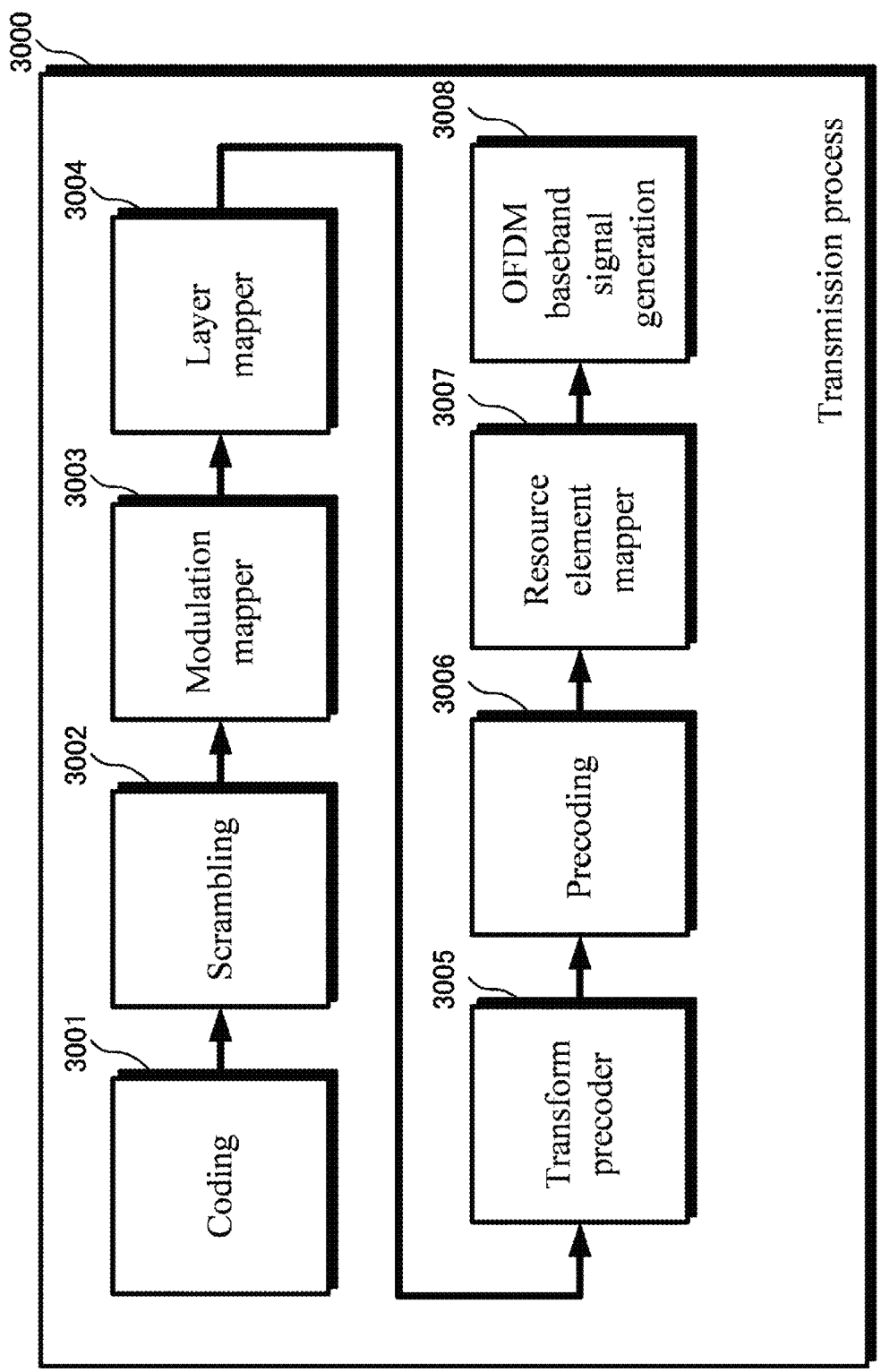
FIG. 5 is a diagram illustrating an example of a configuration of a transmission process 3000 of a physical layer.

FIG. 5 is a diagram illustrating an example of a configuration of the transmission process 3000 of the physical layer. The Transmission process 3000 includes at least some or all of a coding processing unit (coding) 3001, a scrambling processing unit (Scrambling) 3002, and a modulation map processing unit (Modulation mapper) 3003, a layer map processing unit (Layer mapper) 3004, a transmission precode processing unit (Transform precoder) 3005, a precode processing unit (Precoder) 3006, a resource element map processing unit (Resource element mapper) 3007, and a baseband signal generation processing unit (OFDM baseband signal generation) 3008.

The coding processing unit 3001 may include a function of converting a transport block (or data blocks, transport data, transmission data, transmission codes, transmission blocks, payloads, information, information blocks, or the like) sent (or notified, delivered, transmitted, passed, or the like) from the higher layer to coded bits by error correction coding processing. The error correction coding includes at least some or all of a Turbo code, a Low Density Parity Check (LDPC) code, a convolutional code (or Tail biting convolutional code), and a repetitive code. The coding processing unit 3001 includes a function of transmitting the coded bits to the scrambling processing unit 3002. Details of the operation of the coding processing unit 3001 will be described later.

The scrambling processing unit 3002 may include a function of converting the coded bits into scramble bits by scrambling processing. The scrambled bits may be obtained by taking the sum of the coded bits and the scrambling sequence modulo 2. In other words, the scrambling may be to take the sum of the coded bits and the scrambling sequence modulo 2. The scrambling sequence may be a sequence generated by a pseudo-random function, based on a unique sequence (for example, C-RNTI).

The modulation map processing unit 3003 may include a function of converting the scramble bits into a modulated sequence (modulation symbols) by modulation map processing. The modulation symbol may be obtained by performing modulation processing such as Quaderature Phase Shift Keying (QPSK), 16 Quaderature Amplitude Modulation (QAM), 64QAM, and 256QAM, on the scramble bits.

The layer map processing unit 3004 may include a function of mapping the modulation symbols to each layer. The layer may be an indicator of the multiplicity of physical layer signals in the spatial region. For example, a case that the number of layers is one means that spatial multiplexing is not performed. A case that the number of layers is two means that two types of modulation symbols are spatially multiplexed.

For example, the transmission precode processing unit 3005 may include a function of generating transmission symbols by performing transmission precode processing on the modulation symbols mapped to each layer. The modulation symbols and/or the transmission symbols may be complex value symbols. The transmission precode processing includes processing by DFT spread, DFT spreading, or the like. The transmission precode processing unit 3005 may be given whether or not the transmission precode processing is performed based on the information included in the higher layer signaling. The transmission precode processing unit 3005 may be given whether or not the transmission precode processing is performed based at least on the information included in the first system information. The transmission precode processing unit 3005 may be given whether or not the transmission precode processing of random access message 3 is performed based at least on the information included in the first system information. The transmission precode processing unit 3005 may be given whether or not the transmission precode processing is performed based on the information included in the control channel. The transmission precode processing unit 3005 may be given whether or not the transmission precode processing is performed based on information configured in advance.

For example, the precode processing unit 3006 may include a function of generating transmission symbols for each transmit antenna port by multiplying the transmission symbols by a precoder. Here, the transmit antenna port P is a logical antenna port. One transmit antenna port may be constituted with multiple physical antennas. The logical antenna port may be identified by the precoder.

The antenna port is defined as an antenna port that allows a channel conveyed by a certain symbol in a certain antenna port to be inferred from a channel conveyed by another symbol in the same antenna port. That is, for example, in a case that a first physical channel and a first reference signal are conveyed by symbols in the same antenna port, a channel compensation of the first physical channel may be performed by using the first reference signal. Here, the same antenna port also means that an antenna port number (the number for identifying the antenna port) may be the same. Here, the symbol may be, for example, at least a portion of the OFDM symbol. The symbol may be a resource element.

For example, the resource element map processing unit 3007 may include a function of performing processing of mapping the transmission symbol mapped to the transmit antenna port to resource elements. Details of the mapping method to the resource elements in the resource element map processing unit 3007 will be described later.

The baseband signal generation processing unit 3008 may include a function of converting the transmission symbols mapped to resource elements into a baseband signal. The processing for converting the transmission symbol to the baseband signal may include, for example, inverse Fourier transform processing (Inverse Fast Fourier Transform (IFFT)), window processing (Windowing), filtering processing (Filter processing), and the like.

Hereinafter, the operation of the coding processing unit 3001 will be described in detail.

Figure 6:
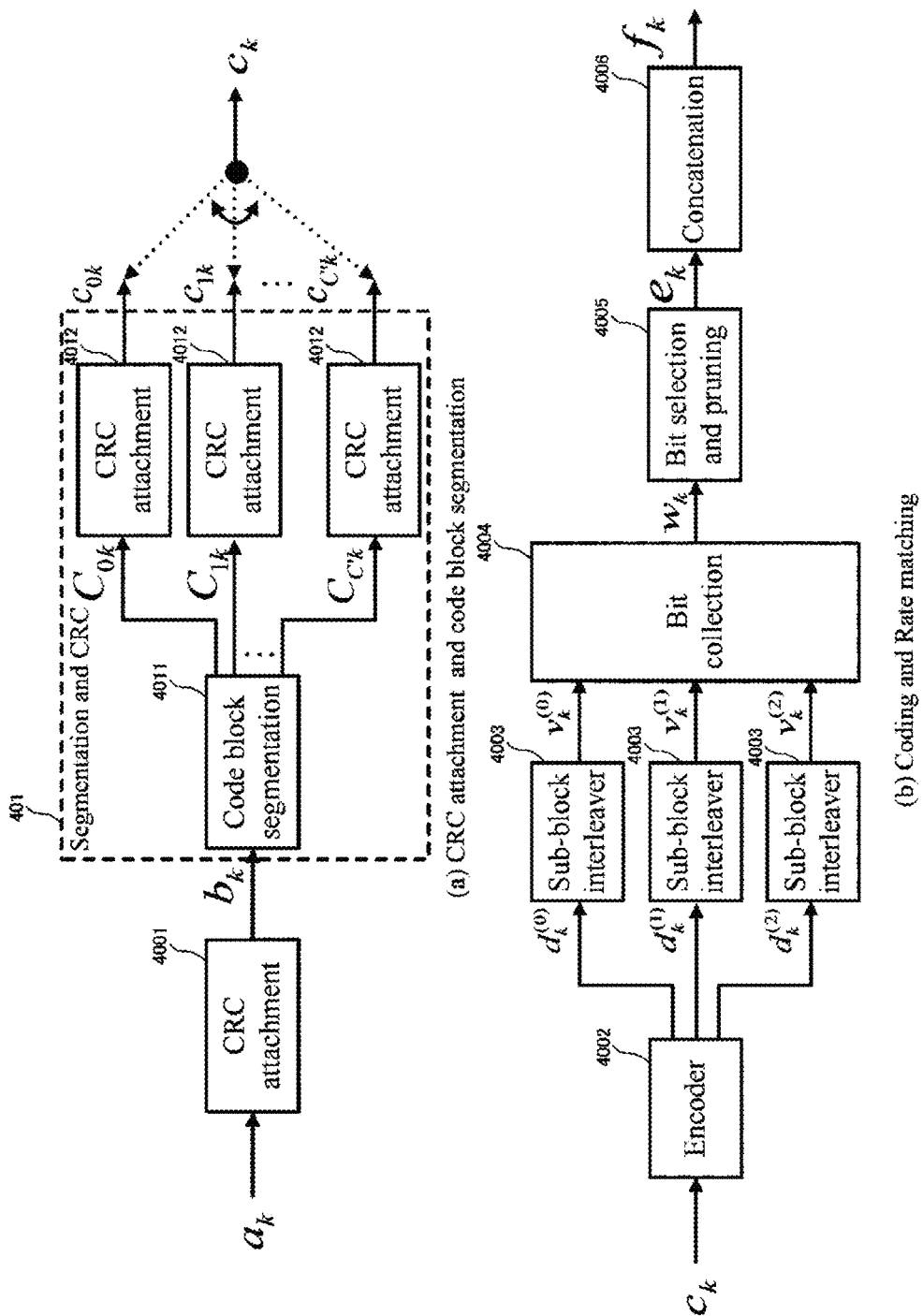
FIG. 6 is a diagram illustrating a configuration example of a coding processing unit 3001 according to the present embodiment.

FIG. 6 is a diagram illustrating a configuration example of the coding processing unit 3001 according to the present embodiment. The coding processing unit 3001 includes at least one of a CRC attachment unit 4001, a Segmentation and CRC attachment (Segmentation and CRC) unit 401, a coding (Encoder) unit 4002, a Sub-block interleaver unit 4003, a Bit collection unit 4004, a Bit selection and pruning unit 4005, and a Concatenation 4006. Here, the segmentation and CRC attachment unit 401 includes at least one of a code block segmentation unit 4011 and one or more CRC attachment units 4012.

The transport block $a_k$ is input to the CRC attachment unit 4001. The CRC attachment unit 4001 may generate a first CRC sequence as a redundancy bit for error detection, based on the input transport block. The generated first CRC sequence is added to the transport block. The first sequence $b_k^0$ including the transport block to which the first CRC sequence is added is output from the CRC attachment unit 4001.

The first CRC sequence may be a CRC sequence corresponding to the transport block. The first CRC sequence may be used to determine whether or not the transport block has been successfully decoded. The first CRC sequence may be used for error detection of the transport block. The first sequence $b_k^0$ may be a transport block to which the first CRC sequence is added.

The first sequence $b_k^0$ may be divided into one or more first sequence groups. The first sequence group is also referred to as a Code Block Group (CBG).

Figure 7:
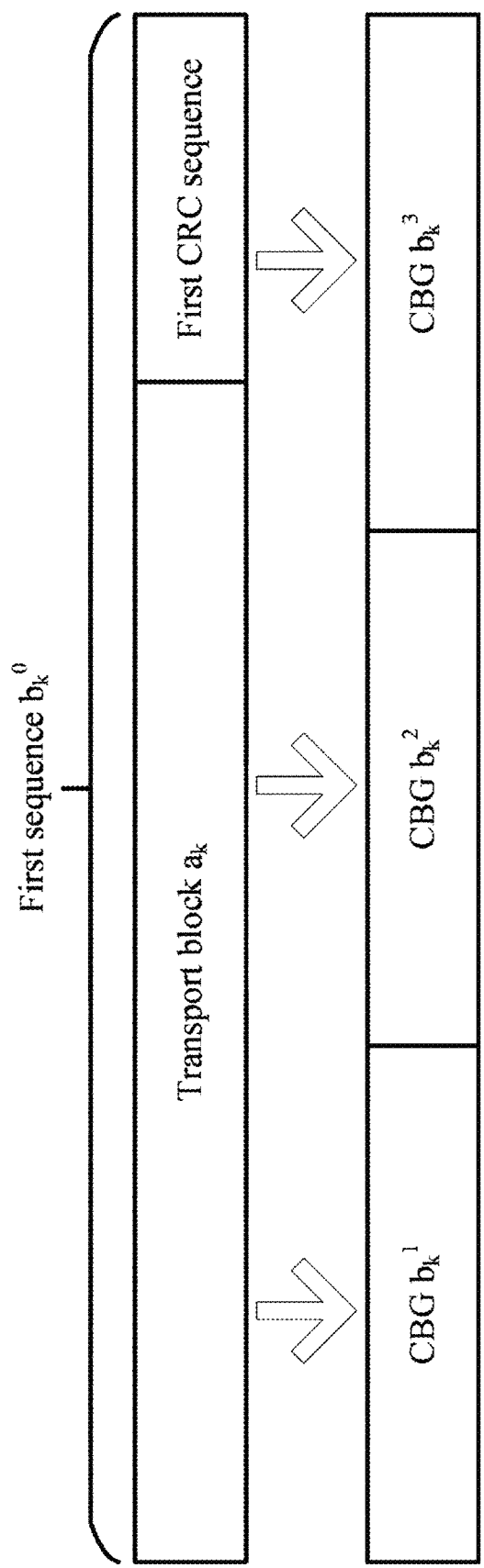
FIG. 7 is a diagram illustrating an example of operations in which a first sequence $b_k^0$ is divided into multiple first sequence groups $b_k^n$ (n=1 to 3 in FIG. 7) according to an aspect of the present embodiment.

FIG. 7 is a diagram illustrating an example of operations in which the first sequence $b_k^0$ is divided into multiple first sequence groups $b_k^n$ (n=1 to 3 in FIG. 7) according to an aspect of the present embodiment. The first sequence groups $b_k^n$ may be sequences having equal lengths or different lengths. The first CRC sequence may be mapped only to one first sequence group (first sequence group $b_k^n$ in FIG. 7).

Figure 8:
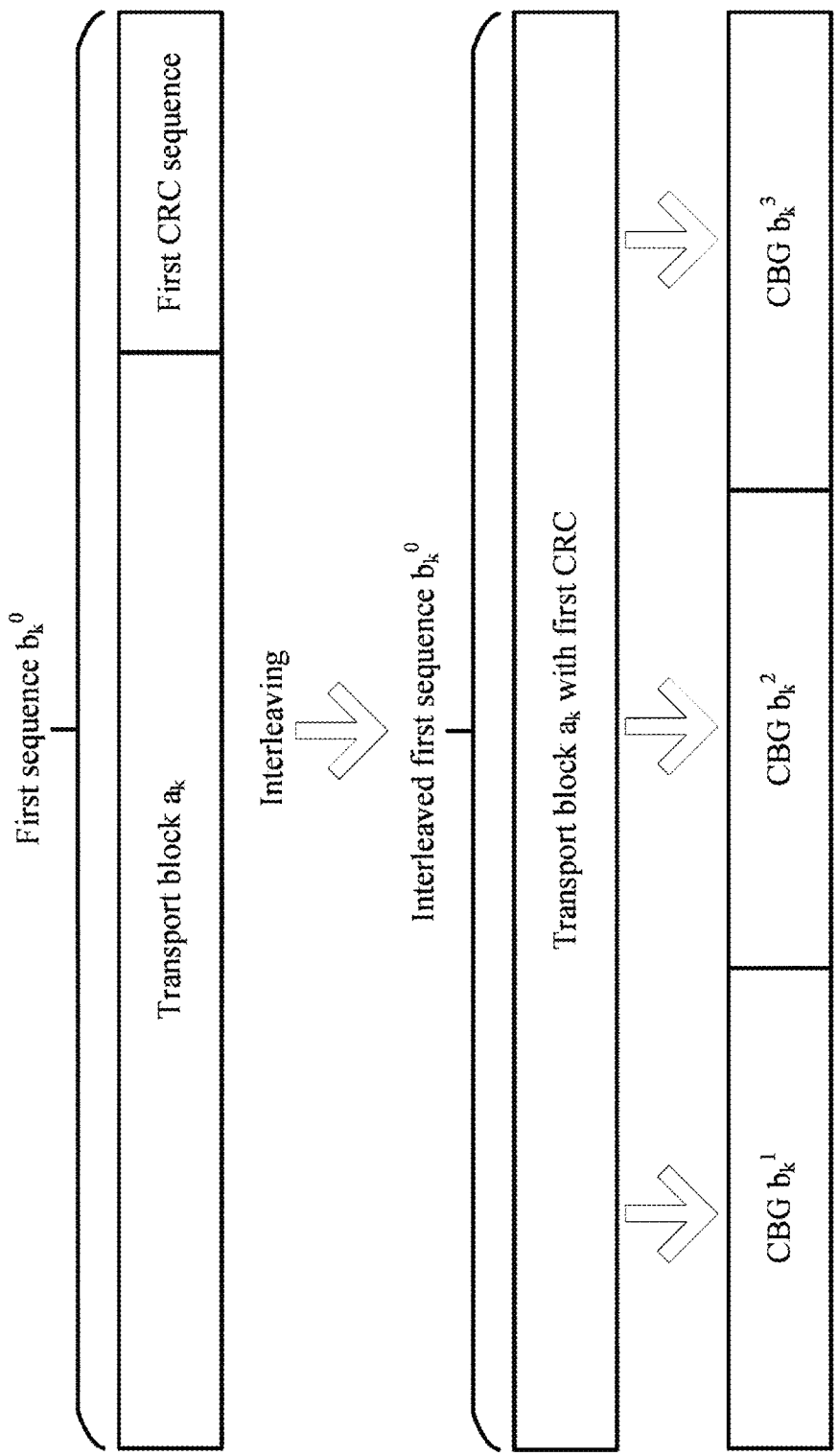
FIG. 8 is a diagram illustrating an example of operations in which the first sequence $b_k^0$ is divided into multiple first sequence groups $b_k^n$ (n=1 to 3 in FIG. 8) according to an aspect of the present embodiment.

FIG. 8 is a diagram illustrating an example of operations in which the first sequence $b_k^0$ is divided into multiple first sequence groups $b_k^n$ (n=1 to 3 in FIG. 8) according to an aspect of the present embodiment. The first sequence $b_k^0$ is sorted (interleaved) based on a first reference, and interleaved first sequence $b_k^0$. The interleaved first sequence $b_k^0$ may be divided into multiple first sequence groups $b_k^n$. In other words, the order of the first sequence $b_k^0$ may be different from the order of the interleaved first sequence $b_k^0$.

The first reference may include a pseudo-random function (for example, M sequence, Gold sequence, or the like). The sorting based on the first reference may include a first sorting. The sorting based on the first reference may be a bit interleave based on the first reference.

Figure 9:
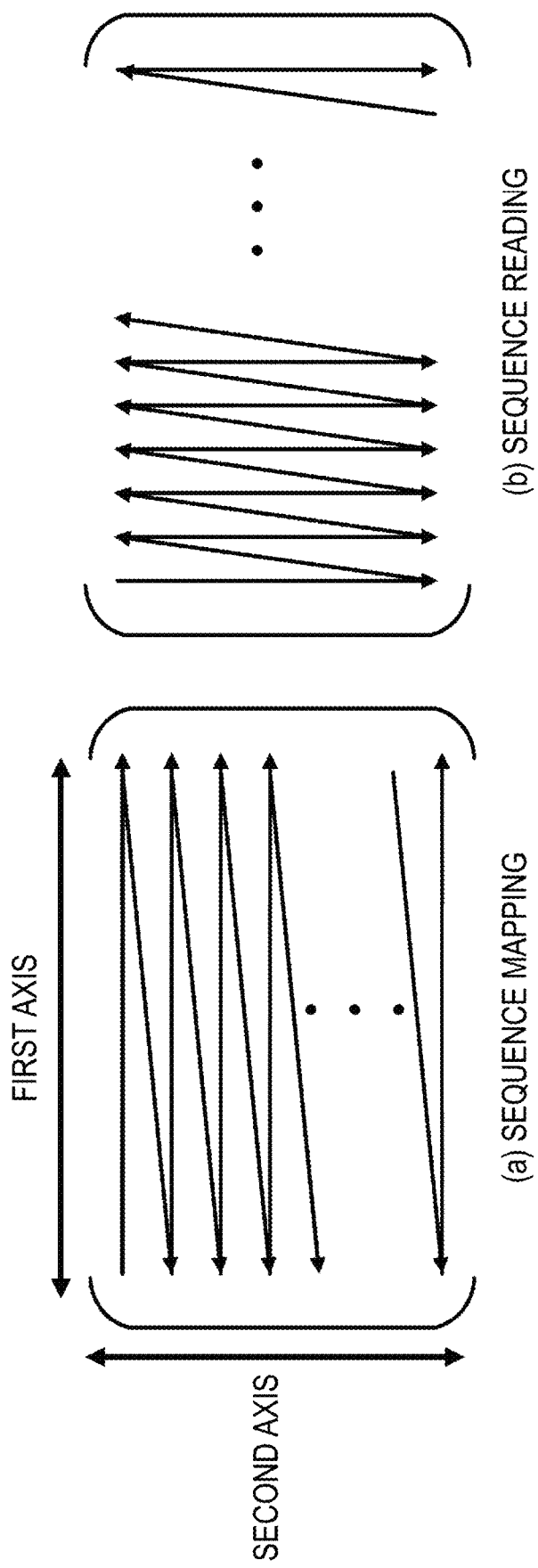
FIG. 9 is an example illustrating a first sorting method according to an aspect of the present embodiment.

FIG. 9 is an example illustrating a first sorting method according to an aspect of the present embodiment. A sequence may be mapped to a two-dimensional block B as illustrated in FIG. 9. The block B includes at least a first axis and a second axis. The first axis is also referred to as a horizontal axis or a column. The second axis is also referred to as a vertical axis or a row. In the block B, a point (entry) identified by a point on the first axis and a point on the second axis is a unit of mapping of the sequence. The sequence may be mapped in a first axial direction on the block B (illustrated in FIG. 9(a)). The sequence being mapped (written) in the first axial direction may be the sequence being mapped in a first-axis prioritized manner. The sequence mapped to the block B may then be read in a second axial direction.

In other words, the first sorting may include at least the following procedures.

(a) The input sequence is mapped in the first axial direction (b) The sequence mapped in the first axial direction is read in the second axial direction Sorting may be performed based on the first reference for each of the first sequence groups $b_k^0$.

A second CRC sequence generated based at least on the first sequence group $b_k^n$ may be added to the first sequence group $b_k^n$. The second CRC sequence may be different in length than the first CRC sequence. The generation method of the second CRC sequence and the first CRC sequence may be different from each other. The second CRC sequence may be used to determine whether or not the n-th first sequence group $b_k^n$ has been successfully decoded. The second CRC sequence may be used for error detection of the n-th first sequence group $b_k^n$. The second CRC sequence may be the second CRC sequence added to the n-th first sequence group $b_k^n$. In a case that the number of first sequence groups $b_k^n$ is equal to the number of code blocks $N_{CB}$, or the number of first sequence groups $b_k^n$ is greater than the number of code blocks $N_{CB}$, the second CRC sequence may not be added to each of the first sequence groups $b_k^n$. In a case that the number of first sequence groups $b_k^n$ is less than the number of code blocks $N_{CB}$, the second CRC sequence may be added to each of the first sequence groups $b_k^n$. For example, in a case that only one code block is included in the first sequence group $b_k''$, the second CRC sequence may not be added to the first sequence group $b_k''$. In a case that two or more code blocks are included in the first sequence group $b_k''$, the second CRC sequence may be added to the first sequence group $b_k''$. In a case that the number of first sequence groups $b_k''$ corresponding to the transport block is one, the second CRC sequence may not be added to the first sequence group $b_k''$.

The second sequence $b_k$ may be input to the code block segmentation unit 4011. The second sequence $b_k$ input into the code block segmentation unit 4011 may be input for each of the first sequence groups $b_k''$. In a case that the first sequence $b_k^0$ is divided into the first sequence groups $b_k''$, the second sequence $b_k$ input into the code block segmentation unit 4011 may be the n-th (n is an integer of 1 or greater) first sequence group $b_k''$. In a case that the first sequence $b_k^0$ is not divided into the first sequence groups $b_k''$, the second sequence $b_k$ input to the code block segmentation unit 4011 may be the first sequence $b_k^0$.

FIG. 10 is a diagram illustrating an example of a first procedure for calculating the number of code blocks in the code block segmentation unit 4011 according to an aspect of the present embodiment. B denotes the number of bits of the second sequence $b_k$. $N_{CB}$ denotes the number of code blocks of the second sequence $b_k$. B' denotes the sum of the number of bits of a third CRC sequence added to each code block and the second sequence $b_k$. L denotes the number of bits of the third CRC sequence added to one code block.

In a case that the number of bits B of the second sequence $b_k$ is equal to or less than the maximum code block length Z, the number of bits of the third CRC sequence L is equal to 0, the number of code blocks $N_{CB}$ is equal to 1, and B' is equal to B. On the other hand, in a case that the number of bits B of the second sequence $b_k$ is greater than the maximum code block length Z, it may be given that L is equal to 24, and the number of code blocks $N_{CB}$ is equal to floor (B/(Z-L)). Where floor (*) is a function of outputting a minimum integer under conditions of not being below *. floor (*) is also referred to as a ceiling function.

The number of bits B of the second sequence $b_k$ may be given by the sum of the number of bits A of the first sequence $a_k$ and the number of bits P of the first CRC bits $p_k$. In other words, it may be given that the number of bits B of the second sequence $b_k$ is equal to A+P.

The number of bits B of the second sequence $b_k$ may include the number of bits of the second CRC sequence.

The maximum code block length Z may be, 6144 or 8192. The maximum code block length Z may be a value other than those described above. The maximum code block length Z may be given based at least on the method of error correction coding used in the coding procedure. For example, the maximum code block length Z may be 6144 in a case that a turbo code is used for the coding procedure. For example, the maximum code block length Z may be 8192 in a case that a Low Density Parity Check (LDPC) code is used for the coding procedure. The LDPC code may be a Quasi-Cyclic LDPC (QC-LDPC) code. The LDPC code may be a LDPC-Convolutional codes (LDPC-CC) coding.

The code block segmentation unit 4011 divides, based at least on the calculated number of code blocks $N_{CB}$. the second sequence $b_k$ into $N_{CB}$ code blocks $C_{rk}$. Here, r denotes an index of the code block. The index r of the code block is given by an integer value included in a range from 0 to $N_{CB}-1$.

The second CRC attachment unit 4012 may include a function of attaching the third CRC sequence for each code block. For example, in a case that the number of code blocks $N_{CB}$ is equal to 1, the third CRC sequence may not be added to the code block. This corresponds to that L is equal to 0 in a case that the number of code blocks $N_{CB}$ is equal to 1. On the other hand, in a case that the number of code blocks $N_{CB}$ is greater than 1, the third CRC sequence of the number of bits L may be added to each of the code blocks. The number of code blocks $N_{CB}$ being greater than 1 corresponds to the second sequence $b_k$ being divided into multiple code blocks. The output of the second CRC attachment unit 4012 is referred to as a code block $c_{rk}$. The code block $c_{rk}$ is the r-th code block.

A code block group (CBG) may be constituted with one or more code blocks. The $N_{CB}$ code blocks may be divided into $N_{CBG}$ CBGs. $N_{CBG}$ is the number of CBGs included in the transport block. For example, the number of CBGs $N_{CBG}$ included in the transport block may be given based on higher layer signaling and/or a description in the specification and/or the like, and the number of code blocks per one CBG $N_{CB\ per\ CBG}$ may be given based at least on the transport block size. The number of code blocks per one CBG $N_{CB\ per\ CBG}$ may be given based on higher layer signaling and/or a description in the specification and/or the like, and the number of CBGs $N_{CBG}$ included in the transport block may be given based at least on the transport block size. The number of code blocks per one CBG $N_{CB\ per\ CBG}$ and the number of CBGs $N_{CBG}$ included in the transport block may be given based at least on the TBS.

The second CRC sequence may be added to the CBG. The second CRC sequence may be given based at least on a bit sequence included in the second CRC sequence. In a case that the number of CBGs $N_{CBG}$ and the number of code blocks $N_{CB}$ are equal or the number of CBGs $N_{CBG}$ is greater than the number of code blocks $N_{CB}$, the second CRC sequence may not be added to the CBG. In a case that the number of CBGs $N_{CBG}$ is less than the number of code blocks $N_{CB}$, the second CRC sequence may be added to the CBG. For example, in a case that the number of code blocks included in one CBG $N_{CB\ per\ CBG}$ is 1, the second CRC sequence may not be added to the CBG. In a case that the number of code blocks included in one CBG $N_{CB\ per\ CBG}$ is 2 or greater, the second CRC sequence may be added to the CBG. In a case that the number of CBGs $N_{CBG}$ is 1, the second CRC sequence may not be added to the CBG.

The sorting based on the first reference may be performed per CBG.

The coding unit 4002 includes a function of performing error correction coding on a given code block $c_k$. As the given code block $c_k$, the r-th code block $c_{rk}$ is input. The coding unit 4002 performs error correction coding on the code block $c_k$, and outputs a Coded bit sequence. In a case that a turbo code is used as an error correction coding scheme, the coded bit sequence is $d_k^{(0)}$, $d_k^{(1)}$, and $d_k^{(2)}$. Here, $d_k^{(0)}$ is also referred to as a systematic bit. $d_k^{(1)}$ and $d_k^{(2)}$ are also referred to as parity bits.

The coded bit sequence may be constituted by one or more sequences. The number of sequences constituting the coded bit sequence is also referred to as $N_{seq}$. In a case that the turbo code is used as an error correction coding scheme, the coded bit sequence may be constituted with three sequences ($d_k^{(0)}$, $d_k^{(1)}$, $d_k^{(2)}$). In other words, in a case that the turbo code is used as an error correction coding scheme, $N_{seq}$ may be equal to 3. In a case that an LDPC code is used as an error correction coding scheme, the coded bit sequence may be constituted with two sequences ($d_k^{(0)}$, $d_k^{(1)}$). In other words, in a case that the LDPC code is used as an error correction coding scheme, $N_{seq}$ may be equal to 2. In a case that the LDPC code is used as an error correction coding scheme, $N_{seq}$ may be a value other than 2. For example, in a case that the LDPC code is used as an error correction coding scheme, $N_{seq}$ may be 1.

The coded bit sequence output from the coding unit 4002 is input to the sub-block interleaver unit 4003 or the bit collection unit 4004. Whether or not the coded bit sequence output from the coding unit 4002 is input to the sub-block interleaver unit 4003 may be given based at least on the error correction coding scheme to be applied.

The sub-block interleaver unit 4003 outputs a rearrangement bit sequence $v_k^{(n)}$ by sorting (interleaving) the input coded bit sequence. n is an integer within a range from 0 to $N_{seq}-1$. The sorting of the coded bits by the sub-block interleaver unit 4003 is based on the first sorting. The number of elements in the column of the sub-block interleaver (first axis) $C_{subblock}$ is 32. The number of elements in the row of the sub-block interleaver (second axis) $R_{subblock}$ may be the smallest integer that satisfies the following Equation 1. Here, D is the number of bits of each of the sequences $d_k^{(n)}$.

$$D \leq (R_{subblock} \times C_{subblock}) \quad \text{Equation 1}$$

The number of bits $K_\pi$ of each of the rearrangement bit sequences $v_k^{(n)}$, which are the output of the sub-block interleaver unit 4003, may be given by Equation 2 below.

$$K_\Pi(R_{subblock} \times C_{subblock}) \quad \text{Equation 2}$$

For example, the sub-block interleaver unit 4003 may be given whether or not a first permutation processing is applied based on the input coded bit sequence. For example, no first permutation processing may be applied to the input coded bit sequence $d_k^{(0)}$ or $d_k^{(1)}$. On the other hand, the first permutation processing may be applied to the input coded bit sequence $d_k^{(2)}$.

The first permutation processing may be a column direction sorting (inter-column permutation). A first pattern P used for the first permutation processing applied in the sub-block interleaver unit 4003 may be P=[0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31].

In a case that the coded bit sequence is input to the bit collection unit 4004, the rearrangement bits $v_k^{(n)}$ may be equal to $d_k^{(n)}$.

The bit collection unit 4004 generates a Virtual circular buffer, based on sorting (rearrangement) the rearrangement bit sequences $v_k^{(n)}$. For example, the virtual circular buffer $w_k$ may be generated based on $w_k = v_k^{(0)}$, $w_{K\Pi+2k} = v_k^{(1)}$, $w_{K\Pi+2k+1} = v_k^{(2)}$. Where $K_\pi$ is the number of bits $v_k^{(0)}$. In the turbo code, $K_w$ is a value indicated by $K_w = 3K_\pi$. The bit collection unit 4004 outputs the virtual circular buffer $w_k$.

The virtual circular buffer $w_k$ may be generated by sorting the $N_{seq}$ rearrangement bit sequences $v_k^{(n)}$, based on a prescribed procedure. The virtual circular buffer $w_k$ is input to the bit selection and pruning unit 4005.

The bit selection and pruning unit 4005 performs a rate matching operation on the virtual circular buffer $w_k$ to generate a rate matching sequence $e_k$. FIG. 11 is a diagram illustrating an example of the rate matching operation of the bit selection and pruning unit 4005 according to an aspect of the present embodiment. The rate matching sequence $e_k$ is obtained from the virtual circular buffer $w_k$. The number of bits of the rate matching sequence $e_k$ is E. The number of bits E of the rate matching sequence $e_k$ is given based at least on resource allocation information for the transport block (or CBG), or the like. $rv_{idx}$ in FIG. 11 is the redundancy version (RV) number for transmission of the corresponding transport block. The RV number may be indicated by information included in the downlink control information. The RV number may be configured based at least on the higher layer signaling. $N_{cb}$ is the soft buffer size per code block and may be expressed by the number of bits. $N_{cb}$ may be given by the following Equation 3.

$$N_{cb} = \min\left(\left\lfloor \frac{N_{IR}}{N_{CB}} \right\rfloor, K_w\right) \quad \text{Equation 3}$$

Here, $N_{IR}$ is a value associated with the soft buffer size per input bit sequence $a_k$, and is expressed by the number of bits. $N_{IR}$ may be given by the following Equation 4.

$$N_{IR} = \left\lfloor \frac{N_{soft}}{K_C \cdot K_{MIMO} \cdot \min(M_{DL\_HARQ}, M_{limit})} \right\rfloor \quad \text{Equation 4}$$

$K_{MIMO}$ may be the same as the maximum number of transport blocks that can be included in one shared channel transmission received based on a transmission mode configured for the terminal apparatus 1. $K_{MIMO}$ may be associated with the maximum number of transport blocks receivable during a prescribed period in a prescribed transmission method.

Here, $M_{DL\_HARQ}$ may be the maximum number of downlink HARQ processes. $M_{DL\_HARQ}$ may be the maximum number of downlink HARQ processes managed in parallel in one corresponding serving cell. $M_{DL\_HARQ}$ may be given based at least on the higher layer signaling. For an FDD serving cell, $M_{DL\_HARQ}$ may be 8. For a TDD serving cell, $M_{DL\_HARQ}$ may correspond to an uplink/downlink configuration (UL/DL configuration). Here, $M_{limit}$ is 8. The uplink/downlink configuration is used in TDD to indicate a mapping of a downlink subframe and an uplink subframe in a radio frame.

Here, the $K_c$ may be any one of {1, 3/2, 2, 8/3, 3, and 5} or may be other values.

Here, the $N_{soft}$ may be a total number of soft channel bits depending on the UE category or the downlink UE category. Here, the soft channel bits are also referred to as soft bits. The soft bits may be information given based on a Log Likelihood Ratio (LLR), or the like, for the bits calculated after error correction decoding. For example, the soft bits may be an amount given based at least on the LLR. The soft bits may be a value associated with the LLR.

The rate matching sequence $e_k$ corresponding to the r-th code block generated by the bit selection and pruning unit 4005 is also referred to as a rate matching sequence $e_{rk}$. The $N_{CB}$ rate matching sequences $e_{rk}$ may be coupled to generate a coded output sequence $f_{k,n}$. $f_{k,n}$ corresponding to multiple CBGs may be coupled to generate the coded output sequence $f_k$.

For the coded output sequence $f_{k,n}$, the coded output sequence $f_{k,n}$ after sorting may be given by sorting based on the first reference. The coded output sequence $f_{k,n}$ corresponding to the multiple CBGs may be coupled to generate the coded output sequence $f_k$.

The $N_{CB\_per\_CBG}$ rate matching sequences $e_{rk}$ may be coupled to generate the coded output sequence $f_k$.

The coded output sequence $f_k$ may be applied with the second sorting. The second sorting may include at least the following procedures.

(a) The input sequence is mapped in the first axial direction (b) The sequence mapped in the first axial direction is mapped in the second axial direction The sequence input in the second sorting may be a sequence given based at least on one or both of a modulation order of the modulation scheme corresponding to the transport block and the number of transmission layer of the transport block. The number of each element (coding modulation symbol) of the sequence input in the second sorting may be given by the product of the modulation order of the modulation scheme corresponding to the transport block and the number of transmission layer of the transport block. The coded modulation symbol is a group including a portion of the coded output sequence $f_k$. One modulation symbol is generated by modulating each group including a portion of the coded output sequence $f_k$. In a case that one transport block is mapped to one layer, one coding modulation symbol may include the same number of coded output sequences $f_k$ as the modulation order of the modulation scheme for the transport block. In a case that one transport block is mapped to two layer, one coding modulation symbol may include the same number of coded output sequences $f_k$ as the number of the modulation order $Q_m$ of the modulation scheme for each transport block multiplied by two.

The sequence output in the second sorting is also referred to as an output sequence $h_k$. In a case that the second sorting is not applied to the coded output sequence $f_k$, the output sequence $h_k$ may be constituted by the coded output sequence $f_k$.

Hereinafter, operation details of the resource element map processing unit 3007 will be described.

The resource element map processing unit 3007 maps the transmission symbol to the resource element. In the resource element map processing unit 3007, the transmission symbol may be applied to the first map processing or the second map processing. The first map processing may be the transmission symbol being mapped in the first axial direction. The second map processing may be the transmission symbol being mapped in the second axial direction.

The first axis may correspond to the frequency axis (subcarrier index). The second axis may correspond to the time axis (OFDM symbol index). In other words, the first map processing is also referred to as Frequency first mapping. The second map processing is also referred to as Time first mapping.

The first map processing and/or the second map processing may further include a second permutation processing. The second permutation processing may be a column direction sorting. The second permutation processing may be a frequency direction sorting. The second permutation processing may be a time direction sorting.

An example of a generation method of a channel in the transmission process 3000 according to an aspect of the present invention will be described below.

The terminal apparatus 1 and/or the base station apparatus 3 may switch between operation 1 and operation 2, based at least on a prescribed condition 11. For example, the terminal apparatus 1 and/or the base station apparatus 3 may apply operation 1 in a case that the prescribed condition 11 is at least satisfied. In the terminal apparatus 1 and/or the base station apparatus 3, operation 2 may be applied in a case that the prescribed condition 11 is at least not satisfied.

The prescribed condition 11 may include whether the signal waveform used to transmit a channel is a first signal waveform or a second signal waveform. For example, operation 1 may be applied in a case that the signal waveform used to transmit the channel is the first signal waveform. Operation 2 may be applied in a case that the signal waveform used to transmit the channel is the second signal waveform. The first signal waveform may be OFDM. The second signal waveform may be DFT-s-OFDM.

Whether the signal waveform used to transmit the channel is the first signal waveform or the second signal waveform may be given based at least on some or all of the MIB, the first system information, the second system information, the common RRC signaling, the dedicated RRC signaling, and the downlink control information.

The prescribed condition 11 may include whether or not a transmission precode processing is performed on the modulation symbol in the transmission of the channel. For example, operation 1 may be applied in a case that the transmission precode processing is not performed on the modulation symbol in the transmission of the channel. Operation 2 may be applied in a case that the transmission precode processing is not performed on the modulation symbol in the transmission of the channel.

Whether or not the transmission precode processing is performed on the modulation symbols in the transmission of the channel may be given based on at least some or all of the MIB, the first system information, the second system information, the common RRC signaling, the dedicated RRC signaling, and the downlink control information.

The prescribed condition 11 may include whether or not the second sorting is applied to the coded output sequence $f_k$ in the transmission of the channel. For example, operation 1 may be applied in a case that the second sorting is applied to the coded output sequence $f_k$ in the transmission of the channel. Operation 2 may be applied in a case that the second sorting is not applied to the coded output sequence $f_k$ in the transmission of the channel. Operation 2 may be applied in a case that the second sorting is applied to the coded output sequence $f_k$ in the transmission of the channel. Operation 1 may be applied in a case that the second sorting is not applied to the coded output sequence $f_k$ in the transmission of the channel.

Whether or not the second sorting is applied to the coded output sequence $f_k$ in the transmission of the channel may be given based at least on some or all of the MIB, the first system information, the second system information, the common RRC signaling, the dedicated RRC signaling, and the downlink control information.

The prescribed condition 11 may include whether the first map processing is applied or the second map processing is applied to the transmission symbols in the transmission of the channel. For example, operation 1 may be applied in a case that the first map processing is applied to the transmission symbols in the transmission of the channel. Operation 2 may be applied in a case that the second map processing is applied to the transmission symbols in the transmission of the channel. Operation 2 may be applied in a case that the first map processing is applied to the transmission symbols in the transmission of the channel. Operation 1 may be applied in a case that the second map processing is applied to the transmission symbols in the transmission of the channel.

Whether the first map processing is applied or the second map processing is applied to the transmission symbols in the transmission of the channel may be given based at least on some or all of the MIB, the first system information, the second system information, the common RRC signaling, the dedicated RRC signaling, and the downlink control information.

Operation 1 may include at least some or all of the following operations 1A to 1I.

(1A) The first sequence $b_k^0$ is divided into the first sequence groups (1B) The sorting based on the first reference is performed on the first sequence $b_k^0$ (1C) The sorting based on the first reference is performed on each of the first sequence groups $b_k^n$ (1D) The second CRC sequence is added to the first sequence groups $b_k^n$ (1E) The sorting based on the first reference is performed on the CBGs (1F) The second permutation processing is performed on the transmission symbols (1G) The information indicating the transmission of the CBGs and/or information associated with the soft bits is included in the downlink control information for scheduling the transmission of PDSCH and/or PUSCH (1H) The HARQ-ACK generated for each CBG is feedback (1I) The information indicating the transmission of the CBGs and/or information associated with the soft bits is included in the downlink control information and transmitted In operation 1G, in a case of the initial transmission of the PDSCH and/or the PUSCH, information indicating the transmission of the CBGs may be reserved. In addition, in a case of the initial transmission of the PDSCH and/or the PUSCH, information associated with the soft bits may be reserved. The downlink control information in operation 1G may be transmitted in the format of the first downlink control information (first DCI format).

Operation 1H may be that, in a case that transmission of a transport block that corresponds to a prescribed HARQ process number and is scheduled by the downlink control information is a retransmission of the transport block that corresponds to the prescribed HARQ process number and is transmitted immediately before, the downlink control information includes an HARQ-ACK generated for each CBG.

Operation 1H may be that the first HARQ-ACK includes the second HARQ-ACK. The second HARQ-ACK may be an HARQ-ACK generated for each CBG. The second HARQ-ACK may be an HARQ-ACK for the CBG. Operation 1H may be that the first HARQ-ACK does not include the third HARQ-ACK. The third HARQ-ACK may be an HARQ-ACK generated for each transport block. The third HARQ-ACK may be an HARQ-ACK for the transport block.

Operation 2 may be that some or all of the operations included in operation 1 are not performed. In other words, operation 2 may include at least some or all of the following operations 2A to 2I.

(2A) The first sequence $b_k^0$ is not divided into the first sequence groups (2B) The sorting based on the first reference is not performed on the first sequence $b_k^0$ (2C) The sorting based on the first reference is not performed on each of the first sequence groups $b_k^n$ (2D) The second CRC sequence is not added to the first sequence groups $b_k^n$ (2E) The sorting based on the first reference is not performed on the CBGs (2F) The second permutation processing is not performed on the transmission symbols (2G) The information indicating the transmission of the CBGs and/or information associated with the soft bits is included in the downlink control information for scheduling the transmission of PDSCH and/or PUSCH to perform scheduling (2H) The HARQ-ACK generated for each CBG is not feedback (2I) The information indicating the transmission of the CBGs and/or information associated with the soft bits is not included in the downlink control information and transmitted (or the information indicating the transmission of CBGs and/or a bit sequence configured in advance on information associated with the soft bits is input to the downlink control information)

The downlink control information in operation 2G may be transmitted in a second downlink control information format (second DCI format).

Operation 2H may be that, in a case that transmission of a transport block that corresponds to a prescribed HARQ process number and is scheduled by the downlink control information is a retransmission of the transport block that corresponds to the prescribed HARQ process number and is transmitted immediately before, the downlink control information does not include an HARQ-ACK generated for each CBG.

Operation 2H may be that the first HARQ-ACK does not include the second HARQ-ACK. Operation 2H may be that the first HARQ-ACK includes a third HARQ-ACK feedback.

Whether or not operation 1 is applied based on the prescribed condition 11 may be given based at least on first configuration information included in the higher layer signaling and/or the downlink control information. For example, whether or not operation 1 is applied may be given based on the prescribed condition 11 in a case that operation 1 being applied is triggered by the first configuration information. Operation 1 may not be applied regardless of the prescribed condition 11 in a case that operation 1 not being applied is triggered by the first configuration information. Operation 2 may be applied regardless of the prescribed condition 11 in a case that operation 1 not being applied is triggered by the first configuration information.

Operation 2 may include at least some or all of the operations 1A to 1F. Whether or not operation 2 is applied based on the prescribed condition 11 may be given based at least on the second configuration information included in the higher layer signaling and/or the downlink control information. For example, whether or not operation 2 is applied may be given based on the prescribed condition 11 in a case that operation 2 being applied is triggered by the second configuration information. The second operation may not be applied regardless of the prescribed condition 11 in a case that operation 2 not being applied is triggered by the second configuration information.

The capability information indicating whether or not part of or all of operation 1 is supported in the terminal apparatus 1 may be transmitted by using the higher layer signaling by the terminal apparatus 1. The capability information indicating whether or not part of or all of operation 1 is supported in the terminal apparatus 1 may be given for each signal waveform. For example, the capability information for OFDM and the capability information for DFT-s-OFDM may be transmitted by the terminal apparatus 1.

In a case that operation 1 is applied, the second CRC sequence may be added to the CBG. In a case that operation 2 is applied, the second CRC sequence may not be added to the CBG. In a case of configuring that the second HARQ-ACK is included in the first HARQ-ACK, the second CRC sequence may be added to the CBG. In a case of configuring that the third CRC is included in the first HARQ-ACK, the second CRC sequence may not be added to the CBG. In a case of not configuring that the third HARQ-ACK is included in the first HARQ-ACK, the second CRC sequence may not be added to the CBG. In a case of not configuring that the third CRC is included in the first HARQ-ACK, the second CRC sequence may not be added to the CBG.

A reception method of a channel included in the terminal apparatus 1 and/or the base station apparatus 3 will be described below.

In the reception of the channel, the terminal apparatus 1 and/or the base station apparatus 3 performs demodulation processing and decoding processing, based on the generation of the channel based on the transmission process 3000. Based at least on the first CRC sequence included in the decoded transport block, whether or not the transport block is successfully decoded may be given. The HARQ-ACK for the transport block may be given based on whether or not the transport block is successfully decoded.

In a case that the transport block is successfully decoded, the terminal apparatus 1 may generate an ACK for the transport block. In a case that the CBG is not successfully decoded, the terminal apparatus 1 may generate a NACK for the transport block. The transport block being successfully decoded may mean that all code blocks of the transport block being successfully decoded.

In the reception of the channel, whether or not the CBG is successfully decoded may be given based at least on the second CRC sequence. In the reception of the channel, whether or not the CBG is successfully decoded may be given based at least on the third CRC sequence. For example, whether or not the CBG is successfully decoded may be given based on the third CRC sequence added to all the code blocks included in the CBG. The HARQ-ACK for the CBG may be given based on whether or not the CBG is successfully decoded.

In a case that the CBG is successfully decoded, the terminal apparatus 1 may generate the ACK for the CBG. In a case that the CBG is not successfully decoded, the terminal apparatus 1 may generate the NACK for the CBG. The CBG being successfully decoded may mean that all code blocks of the CBG being successfully decoded.

An apparatus configuration of the terminal apparatus 1 according to the present invention will be described below.

Figure 12:
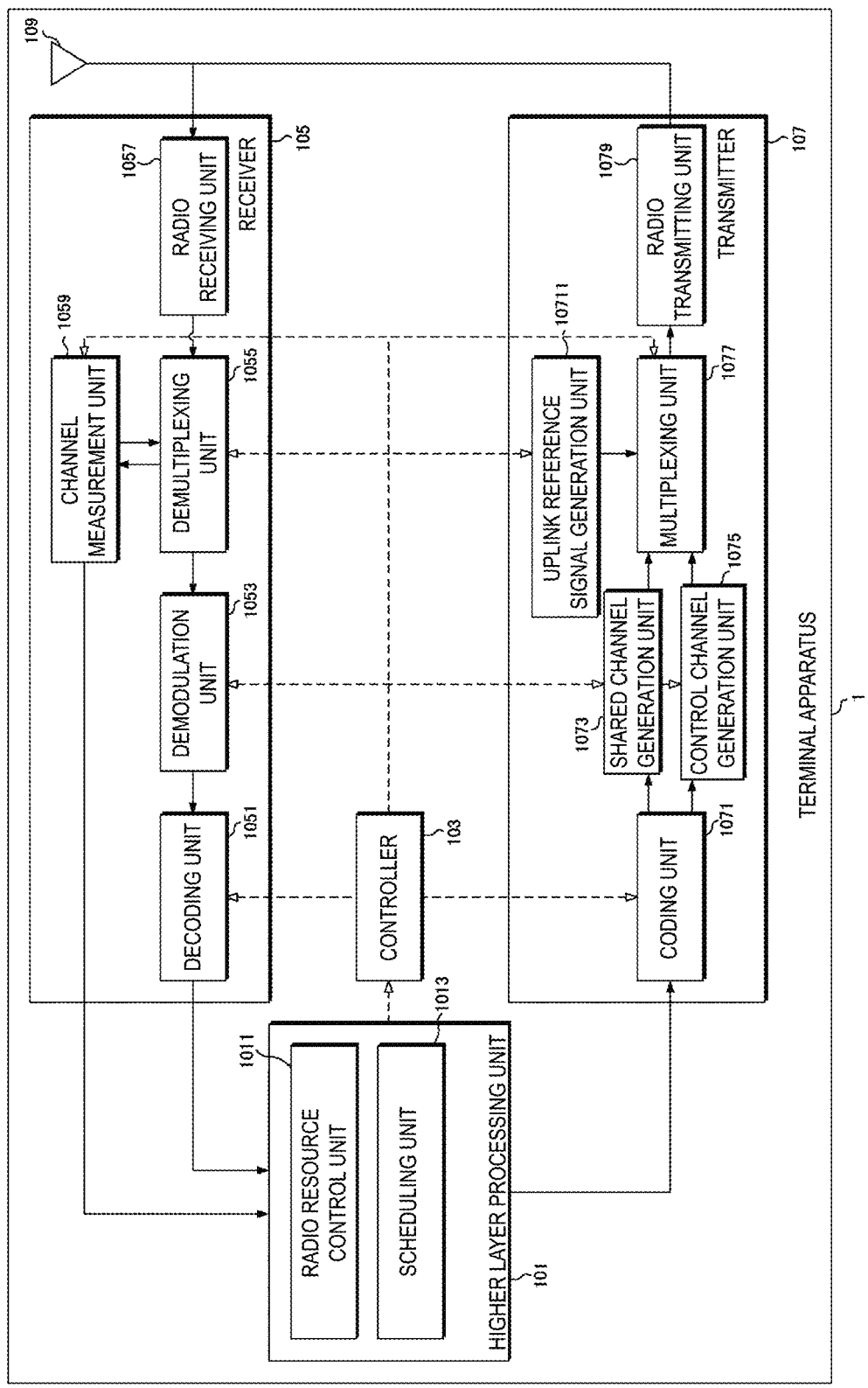
FIG. 12 is a schematic block diagram illustrating a configuration of a terminal apparatus 1 according to the present embodiment.

FIG. 12 is a schematic block diagram illustrating a configuration of the terminal apparatus 1 according to the present embodiment. As illustrated, the terminal apparatus 1 includes at least one of a higher layer processing unit 101, a controller 103, a receiver 105, a transmitter 107, and a transmit and receive antenna 109. The higher layer processing unit 101 includes at least one of a radio resource control unit 1011 and a scheduling unit 1013. The receiver 105 includes at least one of a decoding unit 1051, a demodulation unit 1053, a demultiplexing unit 1055, a radio receiving unit 1057, and a channel measurement unit 1059. The transmitter 107 includes at least one of a coding unit 1071, a shared channel generation unit 1073, a control channel generation unit 1075, a multiplexing unit 1077, a radio transmitting unit 1079, and an uplink reference signal generation unit 10711.

The higher layer processing unit 101 outputs the uplink data generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates control information for control of the receiver 105 and the transmitter 107, based on downlink control information received on the control channel, and the like, and outputs the generated control information to the controller 103.

The radio resource control unit 1011 included in the higher layer processing unit 101 manages various configuration information of the terminal apparatus 1. For example, the radio resource control unit 1011 manages the configured serving cell. Furthermore, the radio resource control unit 1011 generates information to be mapped to each uplink channel, and outputs the generated information to the transmitter 107. In a case of successfully decoding the received downlink data, the radio resource control unit 1011 generates an ACK, and outputs the ACK to the transmitter 107, and in a case that decoding of the received downlink data is failed, the radio resource control unit 1011 generates a NACK, and outputs the NACK to the transmitter 107.

The scheduling unit 1013 included in the higher layer processing unit 101 stores the downlink control information received via the receiver 105. The scheduling unit 1013 controls the transmitter 107 via the controller 103 so as to transmit the PUSCH in accordance with the received uplink grant in the subframe four subframes after the subframe in which the uplink grant has been received. The scheduling unit 1013 controls the receiver 105 via the controller 103 so as to receive the shared channel in accordance with the received downlink grant, in the subframe in which the downlink grant has been received.

In accordance with the control information originating from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and receive antenna 109, and outputs the decoded information to the higher layer processing unit 101.

The radio receiving unit 1057 orthogonally demodulates the downlink signal received via the transmit and receive antenna 109, and converts the orthogonally-demodulated analog signal to a digital signal. For example, the radio receiving unit 1057 may perform Fast Fourier Transform (FFT) on the digital signal, and extract a signal in the frequency domain.

The demultiplexing unit 1055 demultiplexes the extracted signal into the control channel, the shared channel, and the reference signal channel. The demultiplexing unit 1055 outputs the reference signal channel resulting from the demultiplexing, to the channel measurement unit 1059.

The demodulation unit 1053 demodulates the control channel and the shared channel with respect to a modulation scheme such as QPSK, 16 Quadrature Amplitude Modulation (QAM), 64QAM, and outputs the result of the demodulation to the decoding unit 1051.

The decoding unit 1051 decodes the downlink data and outputs the decoded downlink data to the higher layer processing unit 101. The channel measurement unit 1059 calculates a downlink channel estimate from the reference signal channel and outputs the calculated downlink channel estimate to the demultiplexing unit 1055. The channel measurement unit 1059 calculates channel state information, and outputs the channel state information to the higher layer processing unit 101.

The transmitter 107 generates an uplink reference signal channel in accordance with the control signal input from the controller 103, codes and modulates the uplink data and the uplink control information input from the higher layer processing unit 101, multiplexes the shared channel, the control channel, and the reference signal channel, and transmits the signal resulting from the multiplexing to the base station apparatus 3 through the transmit and receive antenna 109.

The coding unit 1071 codes the uplink control information and the uplink data input from the higher layer processing unit 101, and outputs coded bits to the shared channel generation unit 1073 and/or the control channel generation unit 1075.

The shared channel generation unit 1073 may modulate the coded bits input from the coding unit 1071 to generate a modulation symbol, and generate a shared channel by performing DFT on the modulation symbol, and output the generated shared channel to the multiplexing unit 1077. The shared channel generation unit 1073 may modulate the coded bits input from the coding unit 1071 to generate a shared channel and output the generated shared channel to the multiplexing unit 1077.

The control channel generation unit 1075 generates a control channel, based on the coded bits input from the coding unit 1071 and/or SR, and outputs the generated control channel to the multiplexing unit 1077.

The uplink reference signal generation unit 10711 generates the uplink reference signal, and outputs the generated uplink reference signal to the multiplexing unit 1077.

The multiplexing unit 1077 multiplexes a signal input from the shared channel generation unit 1073 and/or a signal input from the control channel generation unit 1075, and/or an uplink reference signal input from the uplink reference signal generation unit 10711, in accordance with the control signal input from the controller 103, into uplink resource elements for each transmit antenna port.

The radio transmitting unit 1079 performs Inverse Fast Fourier Transform (IFFT) on a signal resulting from the multiplexing, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

An apparatus configuration of the base station apparatus 3 according to the present invention will be described below.

Figure 13:
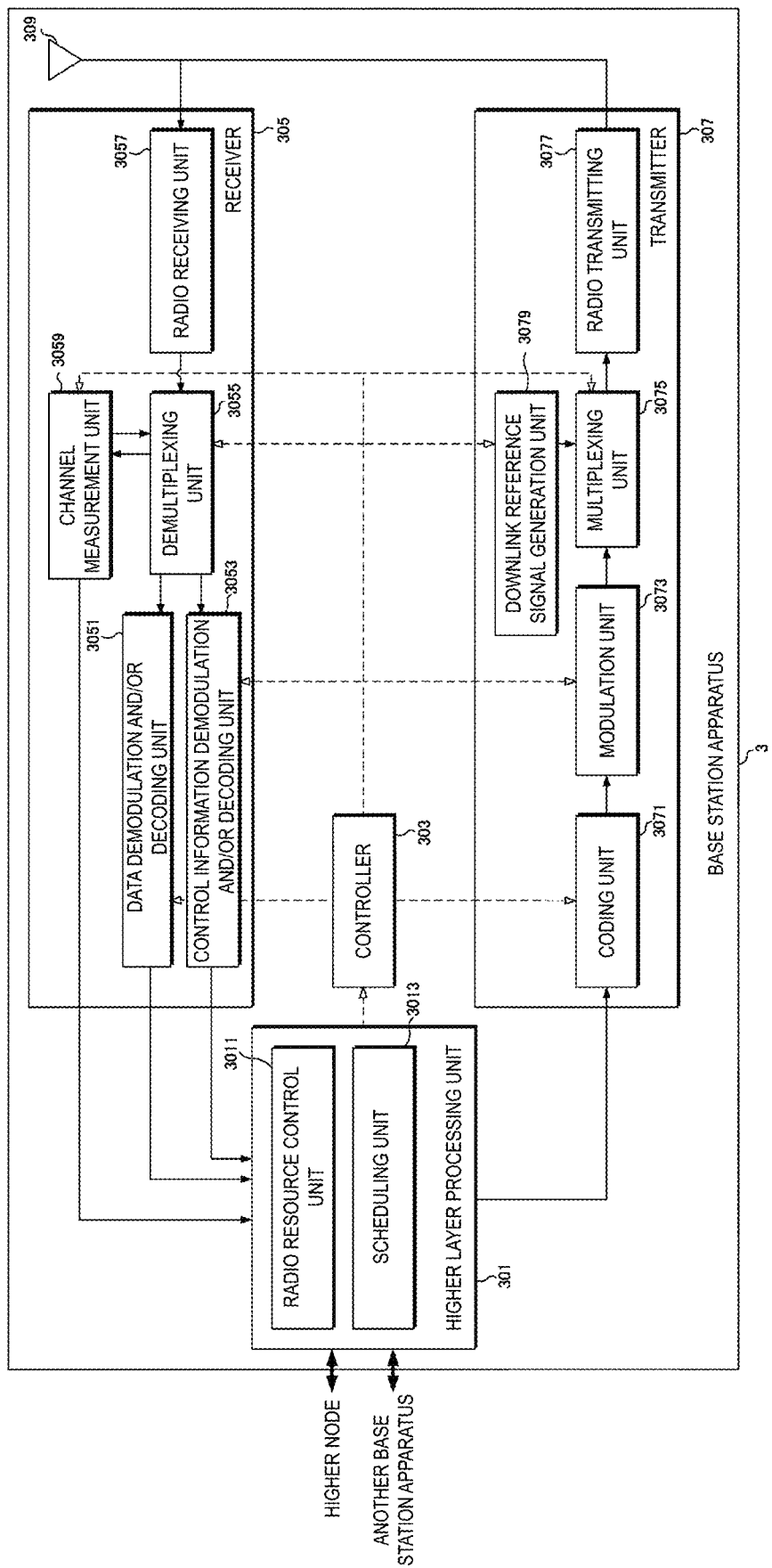
FIG. 13 is a schematic block diagram illustrating a configuration of a base station apparatus 3 according to the present embodiment.

FIG. 13 is a schematic block diagram illustrating a configuration of the base station apparatus 3 according to the present embodiment. As illustrated, the base station apparatus 3 includes a higher layer processing unit 301, a controller 303, a receiver 305, a transmitter 307, and a transmit and receive antenna 309. The higher layer processing unit 301 includes a radio resource control unit 3011, and a scheduling unit 3013. The receiver 305 includes a data demodulation and/or decoding unit 3051, a control information demodulation and/or decoding unit 3053, a demultiplexing unit 3055, a radio receiving unit 3057, and a channel measurement unit 3059. The transmitter 307 includes a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, downlink data, RRC signaling, and MAC Control Element (CE), to be mapped to the downlink shared channel, and outputs the data resulting from the generation or the acquirement to the HARQ control unit 3013. Furthermore, the radio resource control unit 3011 manages various configuration information for each of the terminal apparatuses 1. For example, the radio resource control unit 3011 manages the serving cell configured for the terminal apparatus 1, and the like.

The scheduling unit 3013 included in the higher layer processing unit 301 manages radio resources of the shared channel and the control channel allocated to the terminal apparatus 1. In a case that radio resources of the shared channel are allocated to the terminal apparatus 1, the scheduling unit 3013 generates an uplink grant indicating the allocation of the radio resources of the shared channel, and outputs the generated uplink grant to the transmitter 307.

Based on the control information originating from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and receive antenna 309, and outputs information resulting from the decoding to the higher layer processing unit 301.

The radio receiving unit 3057 orthogonally demodulates the uplink signal received via the transmit and receive antenna 309, and converts the orthogonally-demodulated analog signal to a digital signal. The radio receiving unit 3057 performs Fast Fourier Transform (FFT) on the digital signal, extracts a signal in the frequency domain, and outputs the resulting signal to the demultiplexing unit 3055.

The demultiplexing unit 1055 demultiplexes the signal input from the radio receiving unit 3057 into signals such as such as a control channel, a shared channel, a reference signal channel. Note that the demultiplexing is performed based on radio resource allocation information that is determined in advance by the base station apparatus 3 using the radio resource control unit 3011 and that is included in the uplink grant notified to each of the terminal apparatuses 1. The demultiplexing unit 3055 makes a compensation of channels including a control channel and a shared channel from the channel estimate input from the channel measurement unit 3059. Furthermore, the demultiplexing unit 3055 outputs the reference signal channel resulting from the demultiplexing, to the channel measurement unit 3059.

The demultiplexing unit 3055 acquires the modulation symbol of the uplink data and the modulation symbol of the uplink control information (HARQ-ACK) from the control channel and the shared channel resulting from the demultiplexing. The demultiplexing unit 3055 outputs the modulation symbol of the uplink data acquired from the shared channel signal to the data demodulation and/or decoding unit 3051. The demultiplexing unit 3055 outputs the modulation symbol of the uplink control information (HARQ-ACK) acquired from the control channel or the shared channel to the control information demodulation and/or decoding unit 3053.

The channel measurement unit 3059 measures the channel estimate, the channel quality, and the like, based on the uplink reference signal input from the demultiplexing unit 3055, and outputs the result of the measurement to the demultiplexing unit 3055 and the higher layer processing unit 301.

The data demodulation and/or decoding unit 3051 decodes the uplink data from the modulation symbol of the uplink data input from the demultiplexing unit 3055. The data demodulation and/or decoding unit 3051 outputs the decoded uplink data to the higher layer processing unit 301.

The control information demodulation and/or decoding unit 3053 decodes the HARQ-ACK from the modulation symbol of HARQ-ACK input from the demultiplexing unit 3055. The control information demodulation and/or decoding unit 3053 outputs the decoded HARQ-ACK to the higher layer processing unit 301.

The transmitter 307 generates the downlink reference signal in accordance with the control signal input from the controller 303, codes and modulates the downlink control information and the downlink data that are input from the higher layer processing unit 301, multiplexes the control channel, the shared channel, the reference signal channel, and transmits the signal to the terminal apparatus 1 through the transmit and receive antenna 309.

The coding unit 3071 codes the downlink control information and the downlink data input from the higher layer processing unit 301. The modulation unit 3073 modulates the coded bits input from the coding unit 3071, in compliance with a modulation scheme such as BPSK, QPSK, 16 QAM, and 64 QAM. The modulation unit 3073 may apply precoding to the modulation symbol. The precoding may include a transmission precode. Note that the precoding may be a multiplication (application) of a precoder.

The downlink reference signal generation unit 3079 generates a downlink reference signal. The multiplexing unit 3075 multiplexes the modulation symbol of each channel and the downlink reference signal to generate a transmission symbol.

The multiplexing unit 3075 may apply precoding to the transmission symbol. The precoding applied by the multiplexing unit 3075 to the transmission symbol may be applied to the downlink reference signal and/or the modulation symbol. The precoding applied to the downlink reference signal and the precoding applied to the modulation symbol may be the same or different from each other.

The radio transmitting unit 3077 performs Inverse Fast Fourier Transform (IFFT) to the multiplexed transmission symbol and the like to generate a time symbol. The radio transmitting unit 3077 performs a modulation of an OFDM scheme to the time symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, and generates a carrier signal (Carrier, RF signal, and the like). The radio transmitting unit 3077 performs power amplification for the carrier signal and outputs and transmits the carrier signal to the transmit and receive antenna 309.

(1) To accomplish the object described above, aspects of the present invention are contrived to provide the following measures. Specifically, a first aspect of the present invention is a terminal apparatus including: a coding unit configured to divide a transport block into multiple CBs and code each of the multiple CBs; a transmitter configured to transmit the transport block by using a PUSCH; and a receiver configured to receive a first HARQ-ACK, wherein each of the multiple CBs is included in any one of multiple CBGs, the first HARQ-ACK includes a second HARQ-ACK for each of the multiple CBGs or a third HARQ-ACK for the transport block, in a case that a signal waveform applied to the PUSCH is OFDM, whether the first HARQ-ACK includes the second HARQ-ACK or the third HARQ-ACK is given based on higher layer signaling, and in a case that a signal waveform applied to the PUSCH is DFT-s-OFDM, the first HARQ-ACK includes the third HARQ-ACK (regardless of the higher layer signaling).

(2) In the first aspect of the present invention, a first CRC sequence is added to the transport block, a second CRC sequence is added to each of the multiple CBs, and in a case that the second HARQ-ACK is included in the first HARQ-ACK, a third CRC sequence is added to each of the multiple CBGs.

(3) A second aspect of the present invention is a base station apparatus including: a receiver configured to receive a transport block on a PUSCH; a decoding unit configured to decode the transport block divided into multiple CBs; and a transmitter configured to transmit a first HARQ-ACK, wherein each of the multiple CBs is included in any one of multiple CBGs, the first HARQ-ACK includes a second HARQ-ACK for each of the multiple CBGs or a third HARQ-ACK for the transport block, in a case that a signal waveform applied to the PUSCH is OFDM, whether the first HARQ-ACK includes the second HARQ-ACK or the third HARQ-ACK is given based on higher layer signaling, and in a case that a signal waveform applied to the PUSCH is DFT-s-OFDM, the first HARQ-ACK includes the third HARQ-ACK (regardless of the higher layer signaling).

(4) In the second aspect of the present invention, a first CRC sequence is added to the transport block, a second CRC sequence is added to each of the multiple CBs, and in a case that the second HARQ-ACK is included in the first HARQ-ACK, a third CRC sequence is added to each of the multiple CBGs.

A program running on each of the terminal apparatus 1 and the base station apparatus 3 according to the present invention may be a program (a program for causing a computer to operate) that controls a Central Processing Unit (CPU) and the like in such a manner as to realize the functions according to the above-described embodiment of the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the terminal apparatus 1 and the base station apparatus 3 according to the above-described embodiment may be achieved as an aggregation (apparatus group) including multiple apparatuses. Each of the apparatuses configuring such an apparatus group may include at least one of each function or each functional block of the terminal apparatus 1 and the base station apparatus 3 according to the above-described embodiment. The apparatus group may include each general function or each functional block of the terminal apparatus 1 and the base station apparatus 3. Furthermore, the terminal apparatus 1 and the base station apparatus 3 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have at least one of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

CROSS-REFERENCE OF RELATED APPLICATION

This application relates to the application of Application No. 2017-109228 filed on Jun. 1, 2017, and claims priority based on the above application. The contents of the above application are incorporated herein by reference.

REFERENCE SIGNS LIST 1 (1A, 1B, 1C) Terminal apparatus
3 Base station apparatus
101 Higher layer processing unit
103 Controller
105 Receiver
107 Transmitter
109 Transmit and receive antenna
1011 Radio resource control unit
1013 Scheduling unit
1051 Decoding unit
1053 Demodulation unit
1055 Demultiplexing unit
1057 Radio receiving unit
1059 Channel measurement unit
1071 Coding unit
1073 Shared channel generation unit
1075 Control channel generation unit
1077 Multiplexing unit
1079 Radio transmitting unit
10711 Uplink reference signal generation unit
301 Higher layer processing unit 303 Controller
305 Receiver
307 Transmitter
309 Transmit and receive antenna
3000 Transmission process
3001 Coding processing unit
3002 Scrambling processing unit
3003 Modulation map processing unit
3004 Layer map processing unit
3005 Transmission precode processing unit
3006 Precode processing unit
3007 Resource element map processing unit
3008 Baseband signal generation processing unit
3011 Radio resource control unit
3013 Scheduling unit
3051 Data demodulation and/or decoding unit
3053 Control information demodulation and/or decoding unit
3055 Demultiplexing unit
3057 Radio receiving unit
3059 Channel measurement unit
3071 Coding unit
3073 Modulation unit
3075 Multiplexing unit
3077 Radio transmitting unit
3079 Downlink reference signal generation unit
401 Segmentation and CRC attachment unit
4001 CRC attachment unit
4002 Coding unit
4003 Sub-block interleaver unit
4004 Bit collection unit
4005 Bit selection and pruning unit
4006 Concatenation unit
4011 Code block segmentation unit
4012 CRC attachment unit

The invention claimed is:

1. A terminal apparatus comprising:
a processor configured to:
divide a transport block into multiple Code Blocks (CBs);
code each of the multiple CBs;
rate match each of the multiple CBs;
group the multiple CBs into multiple Code Block Groups (CBGs), such that each of the multiple CBs is included in one of the multiple CBGs;
obtain a first sequence by attaching a Cyclic Redundancy Check (CRC) to the transport block, the first sequence including multiple first sequence groups;
obtain multiple second sequence groups; and
a transmitter configured to transmit a rate matching sequence by using a Physical Uplink Shared Channel (PUSCH), wherein:
each of the multiple first sequence groups corresponds to the one of the multiple CBGs,
each of the multiple second sequence groups is obtained by coupling at least one rate matching sequence of at least one CB included in one of the multiple first sequence groups, and
the rate matching sequence is obtained by coupling all of the multiple second sequence groups.

2. A base station apparatus comprising:
a receiver configured to receive a rate matching sequence by using a Physical Uplink Shared Channel (PUSCH), wherein
a first sequence, including multiple first sequence groups, is associated with a transport block divided into multiple Code Blocks (CBs);
each of the multiple CBs is included in one of multiple Code Block Groups (CBGs);
each of the multiple first sequence groups corresponds to the one of the multiple CBGs,
each of multiple second sequence groups is associated with at least one rate matching sequence of at least one CB included in one of the multiple first sequence groups, and
the rate matching sequence is associated with all of the multiple second sequence groups.

3. A communication method used for a terminal apparatus, the communication method comprising:
dividing a transport block into multiple Code Blocks (CBs);
coding each of the multiple CBs;
rate matching each of the multiple CBs;
grouping the multiple CBs into multiple Code Block Groups (CBGs), such that each of the multiple CBs is included in one of the multiple CBGs;
obtaining a first sequence by attaching a Cyclic Redundancy Check (CRC) to the transport block, the first sequence including multiple first sequence groups;
obtaining multiple second sequence groups; and
transmitting a rate matching sequence by using a Physical Uplink Shared Channel (PUSCH), wherein
each of the multiple first sequence groups corresponds to the one of the multiple CBGs,
each of the multiple second sequence groups is obtained by coupling at least one rate matching sequence of at least one CB included in one of the multiple first sequence groups, and
the rate matching sequence is obtained by coupling all of the multiple second sequence groups.

4. A communication method used for a base station apparatus, the communication method comprising:
receiving a rate matching sequence by using a Physical Uplink Shared Channel (PUSCH), wherein
a first sequence, including multiple first sequence groups, is associated with a transport block divided into multiple Code Blocks (CBs);
each of the multiple CBs is included in one of multiple Code Block Groups (CBGs);
each of the multiple first sequence groups corresponds to the one of the multiple CBGs,
each of multiple second sequence groups is associated with at least one rate matching sequence of at least one CB included in one of the multiple first sequence groups, and
the rate matching sequence is associated with all of the multiple second sequence groups.

* * * * *